US010671750B2

(12) United States Patent
Parthasarathy

(10) Patent No.: US 10,671,750 B2
(45) Date of Patent: Jun. 2, 2020

(54) SYSTEM AND METHOD FOR DATA CLASSIFICATION CENTRIC SENSITIVE DATA DISCOVERY

(71) Applicant: MENTIS INC, New York, NY (US)

(72) Inventor: Rajesh Krishnaswami Parthasarathy, New York, NY (US)

(73) Assignee: MENTIS INC.,NY (US)

( * ) Notice: Subject to any disclaimer, the term of this patent is extended or adjusted under 35 U.S.C. 154(b) by 0 days.

(21) Appl. No.: 16/541,589

(22) Filed: Aug. 15, 2019

(65) Prior Publication Data

US 2020/0057864 A1 Feb. 20, 2020

Related U.S. Application Data

(60) Provisional application No. 62/719,604, filed on Aug. 17, 2018.

(51) Int. Cl.
*G06F 21/62* (2013.01)
*G06F 16/2457* (2019.01)

(52) U.S. Cl.
CPC .... *G06F 21/6218* (2013.01); *G06F 16/24578* (2019.01)

(58) Field of Classification Search
CPC .............. G06F 21/6218; G06F 16/24578
See application file for complete search history.

(56) References Cited

U.S. PATENT DOCUMENTS

| | | | |
|---|---|---|---|
| 8,516,597 B1* | 8/2013 | Sharma ............... | G06F 21/577 705/38 |
| 2013/0262416 A1* | 10/2013 | Devarajan ........... | G06F 16/21 707/694 |
| 2013/0262428 A1* | 10/2013 | Devarajan ........... | G06F 16/951 707/709 |
| 2015/0324606 A1* | 11/2015 | Grondin .............. | H04L 63/205 726/1 |
| 2015/0324609 A1* | 11/2015 | Grubel ................ | G06F 21/64 726/26 |
| 2015/0326601 A1* | 11/2015 | Grondin .............. | G06F 16/24578 726/25 |
| 2017/0091680 A1* | 3/2017 | Rosenthal .......... | G06Q 10/0635 |
| 2018/0075058 A1* | 3/2018 | Boutnaru ............ | H04L 63/04 |

* cited by examiner

*Primary Examiner* — Baotran N To
(74) *Attorney, Agent, or Firm* — Barry Choobin; Patent 360 LLC

(57) ABSTRACT

A method and a sensitive data discovery engine (SDDE) are provided for discovering substantial sensitive data in source systems spanning across similar and variant data sources and applications. The SDDE configures a scanning pathway for scanning data based on a predefined or configurable unique data classification. The scanning pathway defines a sequence of one or more match operations including master data field, dictionary, code, pattern and exact data matches to be performed on the data for the unique data classification. The SDDE executes the match operations in the scanning pathway on the data based on a scan level, scores the data, and determines sensitive data. The SDDE generates a sensitive data discovery map report including locations of the sensitive data and discovery metadata including information of users and programs that access the sensitive data, generated by inspecting application codes, for use in downstream data protection and governance operations.

19 Claims, 21 Drawing Sheets

PATHWAY FOR DISCOVERY OF A NATIONAL IDENTIFIER (NI)

| Step Sequence | | Step Name | Score | Include? |
|---|---|---|---|---|
| 1 | 1 | Master Data Field | 100 | ✓ |
| 2 | 2 | Dictionary Match: Relationship | 60 | |
| 3 | 3 | Code Match | 60 | |
| 4 | 4 | Dictionary Match: Column Name | 60 | ✓ |
| 5 | 5 | Dictionary Match: Column Name Expression | 20 | ✓ |
| 6 | 6 | Pattern Match | 60 | ✓ |
| 7 | 7 | Pattern Match: Validated with functions | 30 | ✓ |
| 8 | 8 | Pattern Match: Validated with master data | 20 | |
| 9 | 9 | Exact Data Match: Tables | 20 | |
| 10 | 10 | Exact Data Match: Repository | 60 | |
| 11 | 11 | Exact Data Match: Entered value | 60 | |

TOTAL 270

NOTE

1. Individual score cannot be greater than 100
2. Total score cannot be less than minimum threshold (60)
3. Pattern Match with validations and Pattern Match with master data can be selected only if pattern match is selected

FIG. 2

PATHWAY FOR DISCOVERY OF A FIRST NAME (FN)

| Step Sequence | Step Name | Score | Include? |
|---|---|---|---|
| 1 | Master Data Field | 100 | ✓ |
| 2 | Dictionary Match: Relationship | 100 | |
| 3 | Code Match | 60 | |
| 4 | Exact Data Match: Tables | 60 | |
| 5 | Exact Data Match: Repository | 100 | |
| 6 | Dictionary Match: Column Name | 60 | ✓ |
| 7 | Dictionary Match: Column Name Expression | 30 | |
| 8 | Exact Data Match: Entered value | 100 | |
| 9 | Pattern Match | 60 | |
| 10 | Pattern Match: Validated with master data | 60 | |
| 11 | Pattern Match: Validated with functions | 60 | |

TOTAL 160

NOTE

1. Individual score cannot be greater than 100
2. Total score cannot be less than minimum threshold (60)
3. Pattern Match with validations and Pattern Match with master data can be selected only if pattern match is selected

FIG. 3

SHOW [10] ▼ ENTRIES

| OWNER | TABLE NAME | COLUMN NAME | REASON TYPE | PATTERN | NO. OF OCCURRENCES | NO. OF ROWS |
|---|---|---|---|---|---|---|
| HR | FF_ARCHIVE_ITEMS | VALUE | PATTERN MATCH | NNN-NN-NNNN | 31 | 535240 |
| HR | FF_CONTEXTS | CONTEXT_LEVEL | PATTERN MATCH | NNNNNNNNN | 4 | 32 |
| HR | FF_GLOBALS_F | GLOBAL_VALUE | PATTERN MATCH | NNNNNNNNN | 6 | 1788 |

| SEARCH OWNER | ff | SEARCH COLUMN | SEARCH REASON TYPE | SEARCH PATTERN | SEARCH NO. OF OCCURRENCES | SEARCH NO. OF ROWS |

| APPLICATION_NAME | INSTANCE_NAME | JOB_START_TIME | JOB_COMPLETION_TIME | MACHINE_TIME | JOB_ID | JOB_RUN_BY | SCAN_TYPE | SAMPLE_SIZE |
|---|---|---|---|---|---|---|---|---|
| Oracle | TEST123 | 5/6/2019 6:21:56 AM | 5/6/2019 11:11:54 PM | 0:4:49:58 | 3348 | TESTAD | SAMPLE | 1000 |
| Oracle | TEST123 | 4/30/2019 2:39:02 AM | 4/30/2019 2:52:52 AM | 0:0:13:50 | 3350 | TESTAD | SAMPLE | 1000 |
| Oracle | TEST123 | 5/8/2019 7:40:48 AM | 5/9/2019 5:56:48 AM | 1:1:44:0 | 3352 | TESTAD | SAMPLE | 1000 |
| Oracle | TEST123 | 5/14/2019 3:39:08 AM | 5/14/2019 3:53:08 AM | 0:0:14:0 | 3354 | TESTAD | SAMPLE | 1000 |
| Oracle | TEST123 | 4/26/2019 6:03:37 AM | 4/26/2019 7:54:28 PM | 0:1:50:51 | 3358 | TESTAD | SAMPLE | 1000 |
| Oracle | TEST123 | 5/14/2019 5:40:33 AM | 5/14/2019 5:44:56 AM | 0:0:4:23 | 3362 | TESTAD | SAMPLE | 1000 |

| TOTAL_SCHEMA_SCANNED | TOTAL_TABLES_SCANNED | TOTAL_COLUMNS_SCANNED | TOTAL_ROWS_SCANNED | SENSITIVE_SCHEMA_SCANNED | SENSITIVE_DATA_TABLES_SCANNED | SENSITIVE_DATA_COLUMNS_SCANNED | SENSITIVE_DATA_ROWS_SCANNED |
|---|---|---|---|---|---|---|---|
| 1 | 22 | 177 | 54804 | 1 | 2 | 2 | 669 |
| 1 | 22 | 177 | 54804 | 1 | 2 | 2 | 669 |
| 1 | 22 | 177 | 54804 | 1 | 14 | 84 | 1057 |
| 1 | 22 | 177 | 54804 | 1 | 1 | 1 | 1057 |
| 1 | 23 | 179 | 54804 | 0 | 0 | 0 | 1038 |
| 1 | 22 | 169 | 44804 | 0 | 0 | 0 | 1005 |

| CLASSIFICATION NAME | CLASSIFICATION TYPES | MINIMUM THRESHOLD | MAXIMUM THRESHOLD | JOB ID | APPLICATION NAME |
|---|---|---|---|---|---|
| First Name | Private Information | 60 | 80 | 3382 | Oracle |
| Address | Private Information | 60 | 80 | 3384 | Oracle |
| National Identifier | Confidential Information | 60 | 80 | 3386 | Oracle |

FIG. 10

| APPLICATION_NAME | CLASSIFICATION_NAME | SCHEMA_OR_DATABASE | TABLE_NAME | COLUMN_NAME | COLUMN_LITERAL | CODE_MATCH_LITERAL | COLUMN_NAME_MATCH | COLUMN_VALUE |
|---|---|---|---|---|---|---|---|---|
| Oracle | Address | HR | PS_PA_RT_ROLLOVER | ADDRESS3 | - | - | 30 | - |
| Oracle | Last Name | HR | PS_DSB_FILE_D_PRS | LAST_NAME | - | - | 30 | - |
| Oracle | National Identifier | HR | PS_HRS_APP_NID | NATIONAL_ID | - | - | 30 | 30 |
| Oracle | First Name | HR | PS_TL_PERS_INFO | FIRST_NAME | - | - | 30 | - |
| Oracle | Bank Account | HR | PS_ST_REL_ISSUE | ST_ACCOUNT_NBR | - | - | 30 | 30 |
| Oracle | Home City | HR | PS_ADDRESSES | CITY | - | - | - | - |

| EXACT_MATCH | MASTER_DATA_MATCH | MASTER_FIELD_COLUMN | MASTER_DATA_VALIDATION | FOREIGN_KEY_LITERAL | REPOS_DATA_MATCH | VALIDATION_FUNCTION | GRAND_TOTAL | STATUS | JOB_ID |
|---|---|---|---|---|---|---|---|---|---|
| 60 | - | - | - | - | - | - | 90 | T | 3386 |
| 60 | - | - | - | - | - | - | 90 | T | 3386 |
| - | - | - | - | - | - | 30 | 90 | T | 3386 |
| 60 | - | - | - | - | - | - | 90 | T | 3382 |
| - | 100 | - | - | - | - | 30 | 90 | T | 3356 |
| - | - | - | - | - | - | - | 100 | T | 3386 |

| APPLICATION_NAME | CLASSIFICATION_NAME | SCHEMA_OR_DATABASE | TABLE_NAME | COLUMN_NAME | COLUMN_LITERAL | CODE_MATCH_LITERAL | COLUMN_NAME_MATCH | COLUMN_VALUE |
|---|---|---|---|---|---|---|---|---|
| Oracle | Salary | HR | JOBS | MIN_SALARY | - | - | 60 | - |
| Oracle | Address | HR | LOC | STREET_ADDRESS | - | - | 60 | - |
| Oracle | Home City | HR | EMP | LOCALITY | - | - | - | - |
| Oracle | National Identifier | HR | PS_GPUS_RSLT_FD_WA | GPUS_TAX_EIN | - | - | - | 30 |
| Oracle | Salary | HR | EMP | SALARY | - | - | 60 | - |
| Oracle | Address | HR | LOCATIONS | STREET_ADDRESS | - | - | 60 | - |

| EXACT_ MATCH | MASTER_ DATA_ MATCH | MASTER_ FIELD_ COLUMN | MASTER_ DATA_VA LIDATION | FOREIGN_ KEY_LI TERAL | REPOS_ DATA_ MATCH | VALIDA TION_FU NCTION | GRAND _TOTAL | STATUS | JOB_ ID |
|---|---|---|---|---|---|---|---|---|---|
| ' | ' | ' | ' | ' | ' | ' | 60 | 1 | 3346 |
| ' | ' | ' | ' | ' | ' | ' | 60 | 1 | 3346 |
| ' | 60 | ' | ' | ' | ' | ' | 60 | 1 | 3346 |
| ' | ' | ' | ' | ' | ' | 30 | 60 | 1 | 3346 |
| ' | ' | ' | ' | ' | ' | ' | 60 | 1 | 3346 |
| ' | ' | ' | ' | ' | ' | ' | 60 | 1 | 3346 |

| APPLICATION_NAME | SCHEMA OR DATABASE | TABLE NAME | COLUMN NAME | DATA TYPE | LENGTH | LEAVE AS IS? | HOW TO CLASSIFY 1301 |
|---|---|---|---|---|---|---|---|
| Oracle | HR | PS_GENL_DEDUCTION | GVT_ADDRESS_CITY | VARCHAR2 | 64 | N | CITY |
| Oracle | HR | PS_GVT_DED_DIST | GVT_ADDRESS_CITY | VARCHAR2 | 64 | N | CITY |
| Oracle | HR | PS_GVT_GARN_PAYEE | GVT_ADDRESS_CITY | VARCHAR2 | 64 | N | CITY |
| Oracle | HR | PS_GVT_GARN_SPEC | GVT_ADDRESS_CITY | VARCHAR2 | 64 | N | CITY |
| Oracle | HR | PS_GVT_IN_TRFC_INFO | GVT_ADDRESS_CITY | VARCHAR2 | 64 | N | CITY |
| Oracle | HR | PS_GVT_TAX_ROUTING | GVT_ADDRESS_CITY | VARCHAR2 | 64 | N | CITY |

FIG. 13

| APPLICATION_NAME | SCHEMA OR DATABASE | TABLE NAME | COLUMN NAME | CLASSIFICATION NAME | REASON FOR CLASSIFICATION | PATTERN | SCORE | QUERY TO CHECK REPORT |
|---|---|---|---|---|---|---|---|---|
| Oracle | HR | MENT_TEST_CIF_BKK | ACN_EXT_NSYN | ACN_EXT_NSYN | Pattern Match | NNNN-NNNNNNNN-NN-NNN | 40 | Query 1 |
| Oracle | HR | MENT_TEST_CIF_BK1 | ACN_EXT_NSYN | ACN_EXT_NSYN | Pattern Match | NNNN-NNNNNNNN-NN-NNN | 40 | Query 2 |
| Oracle | HR | MENT_TEST_CIF_BK | ACN_EXT_NSYN | ACN_EXT_NSYN | Pattern Match | NNNN-NNNNNNNN-NN-NNN | 40 | Query 3 |
| Oracle | HR | MENT_TEST_CIF_BAK | ACN_EXT_NSYN | ACN_EXT_NSYN | Pattern Match | NNNN-NNNNNNNN-NN-NNN | 40 | Query 4 |
| Oracle | HR | MENT_TEST_CIF_NOW | ACN_EXT_NSYN | ACN_EXT_NSYN | Pattern Match | NNNN-NNNNNNNN-NN-NNN | 40 | Query 5 |
| Oracle | HR | MENT_TEST_CIF_BK2 | ACN_EXT_NSYN | ACN_EXT_NSYN | Pattern Match | NNNN-NNNNNNNN-NN-NNN | 40 | Query 6 |

| VERSION_NAME | CLASSIFICATION_NAME | REASON_FOR_CLASSIFICATION | SCHEMA_OR_DATABASE | TABLE_NAME | COLUMN_NAME | DATA_TYPE | LENGTH | SCORE |
|---|---|---|---|---|---|---|---|---|
| Oracle | ACN_EXT_N_SYN | Pattern Match | HR | MENT_TEST_CIF | ACN_EXT_SYN | VARCHAR2 | 100 | 0 |
| Oracle | ACN_EXT_N_SYN | Pattern Match | HR | MENT_TEST_CIF | ACN_EXT_SYN | VARCHAR2 | 100 | 40 |
| Oracle | ACN_EXT_N_SYN | Pattern Match | HR | MENT_TEST_CIF_BK | ACN_EXT_SYN | VARCHAR2 | 100 | 0 |
| Oracle | ACN_EXT_N_SYN | Pattern Match | HR | MENT_TEST_CIF_BK | ACN_EXT_SYN | VARCHAR2 | 100 | 40 |
| Oracle | ACN_EXT_N_SYN | Pattern Match | HR | MENT_TEST_CIF_BK1 | ACN_EXT_SYN | VARCHAR2 | 100 | 0 |
| Oracle | ACN_EXT_N_SYN | Pattern Match | HR | MENT_TEST_CIF_BK1 | ACN_EXT_SYN | VARCHAR2 | 100 | 40 |

FIG. 15A

| PATTERN | NUMBER_OF_OCCURRENCES | JOB_COMPLETION_TIME | JOB_ID | JOB_RUN_BY | TABLE_ROW_COUNT | INCLUDE_EXCLUDE |
|---|---|---|---|---|---|---|
| NNNNNNNN-NN-NN | 4 | 2019-3-13 13.8.1.0 | 3386 | TESTAD | 56 | Include |
| NNNN-NNNNNNNN-NN-NNN | 4 | 2019-3-13 13.8.1.0 | 3386 | TESTAD | 56 | Include |
| NNNNNNNN-NN-NN | 68 | 2019-3-13 13.8.1.0 | 3386 | TESTAD | 10584 | Include |
| NNNN-NNNNNNNN-NN-NNN | 68 | 2019-3-13 13.8.1.0 | 3386 | TESTAD | 10584 | Include |
| NNNNNNNN-NN-NN | 4 | 2019-3-13 13.8.1.0 | 3386 | TESTAD | 56 | Include |
| NNNN-NNNNNNNN-NN-NNN | 4 | 2019-3-13 13.8.1.0 | 3386 | TESTAD | 56 | Include |

FIG. 15B

| MO_ID | MT_ID | MCL_ID | RECLASSIFY | NEW_CLASSIFICATION |
|---|---|---|---|---|
| 11000000 | 11000006 | 11000076 | N | - |
| 11000000 | 11000006 | 11000076 | N | - |
| 11000000 | 11000017 | 11000096 | N | - |
| 11000000 | 11000017 | 11000096 | N | - |
| 11000000 | 11000015 | 11000106 | Y | As Per User Requirement |
| 11000000 | 11000015 | 11000106 | N | - |

SYSTEM AND METHOD FOR DATA CLASSIFICATION CENTRIC SENSITIVE DATA DISCOVERY

CROSS-REFERENCE TO RELATED APPLICATIONS

This application claims the priority to the Provisional Patent Application with Ser. No. 62/719,604, filed in the United States Patent and Trademark Office on Aug. 17, 2018, with the title "AN INTEGRATED SYSTEM AND METHOD FOR SENSITIVE DATA SECURITY". The content of the Provisional Patent Application is incorporated in its entirety by reference herein.

BACKGROUND

Technical Field

The embodiments herein are generally related to data security. The embodiments herein are particularly related to a system and method for securing sensitive data. The embodiments herein are more particularly related to a system and method for a discovery of a substantial sensitive data in source systems spanning across multiple similar and variant data sources and applications based on data classification.

Description of the Related Art

Large enterprises store a massive volume of both structured and unstructured data, including sensitive data used for software applications. This massive volume of data is difficult for most enterprises to process using conventional database and software techniques Sensitive data exist at any location, for example, relational databases, hierarchical databases, file systems, text, documents, external files, complex data locations, composite data locations, unvalidated fields, binary large objects (BLOBs), character large objects (CLOBs), key value pairs, temporary tables such as phantom tables created by a database, structured data sources, unstructured data sources, cloud data sources, big data sources, etc. Sensitive data such as personal identification information, financial information, healthcare information, etc., contains information that, causes security issues to individuals and enterprises, when compromised. As most of the enterprises operate in a cloud computing environment and a volume of big data increases, most of the enterprises lose track of a location of the sensitive data is located and hence find difficulty in taking appropriate measures to protect the sensitive data.

Several organizations, such as banking, insurance, telecom and healthcare organizations, maintain thousands of sensitive applications that are exposed daily to thousands of end users, partners, clients, etc. With the sensitive data being exploited by malicious hackers that steal user identities, the organizations need to detect and protect sensitive data. In addition to identifying sensitive data and the locations of the sensitive data, there is a need for determining/selecting the users and programs that have access to and that have accessed the sensitive data. Identifying sensitive data is a challenge for several reasons. Within an enterprise network, the databases store a massive number of data records that are incessantly modified, added, and deleted. Frequent scans of the data records is performed to ensure that the locations of sensitive data are determined/estimated. However, these frequent scans are computationally intensive and require large computer resources and long scan times. Moreover, a database administrator does not have a functional knowledge and time to analyse every database in the enterprise network and sometimes fails to analyse critical databases that present a high risk. Furthermore, the data sources in source systems of large enterprises ore highly complex, thereby requiring enormous human effort to discover the locations of the sensitive data. As the locations of the sensitive data are unknown, operations such as monitoring, classifying, ranking, detecting suspicious exfiltration events, and protection and governance of the data become difficult tasks.

To avoid data breaches during an accessing of applications and databases, there is a need for protecting sensitive data in the underlying databases. The scope of data protection and governance is expanded/increased from on-premise (on-site) to the cloud. Moreover, a compliance to data protection and governance regulations such as the General Data Protection Regulation (GDPR) and cross-border production and operations, etc., demands a need to invest in securing data. To protect the sensitive data, there is a primary need to identify all the sensitive data present in a database and the locations of the sensitive data. Conventional discovery methods are unable to be scaled across data soirees and applications. The conventional methods of discovering sensitive data comprise, pattern matching, dictionary matching, regular expressions, etc. Other conventional methods identify sensitive data based on classification rules that are set by using a conventional pattern matching approach, or solely by a dictionary matching approach. The conventional methods for identifying the sensitive data locations have numerous challenges. Identifying sensitive data in a database solely by conventional data dictionary-based methods, are not reliable as these methods fail to identify most of the real sensitive data. For example, a dictionary match process solely identifies only a third of sensitive data and their locations.

A combination of pattern matching and regular expressions is also not adequate to reduce false positives to a practicable level. For example, usage of regular expressions and pattern matching results in more than 75% false positives. Moreover, regular expression (regex) and pattern-based searches are unable to find sensitive data in complex columns, composite columns, BLOBs, CLOBs, key value pairs, phantom tables, etc. Still, the conventional methods do not identify reasons and attributes for classifying sensitive data. Furthermore, the conventional methods are unable to distinguish data classifications with the same patterns as they are not data classification centric. While some conventional methods are configured to identify the sensitive data locations only, these methods do not generate metadata composing the users and programs having access to the sensitive data. Furthermore, the conventional discovery mechanisms typically do not have a common metadata of sensitive data across disparate databases across the enterprise. The results obtained through these discovery mechanisms, therefore, are not effectively used in downstream sensitive data protection and governance operations, for example, data masking, data monitoring, etc.

The conventional discovery solutions also lack the ability to consistently discover sensitive data located across data sources and across applications. Typically, the underlying database of any application is updated periodically, due to which, the sensitive data discovery process is typically performed with the conventional methods for the entire database again along with old and new data, which is time consuming and inefficient.

Hence, there is a need for a data classification centric method and a system for discovering substantial sensitive data in source systems spanning across multiple similar and variant data sources such as relational databases, hierarchical databases, structured data sources, unstructured data sources, cloud data sources, big data sources, file systems, text, documents, external files, etc., data locations such as complex data locations, composite data locations, unvalidated fields, BLOBs, CLOBs, key value pairs, temporary tables such as phantom tables created by a database, etc., and applications, with minimal false positives. Moreover, there is a need for a method and a system for configuring data classifications of direct and potential customers by identifying data for allowing flexible definitions. Furthermore, there is a need for a method and a system for generating metadata comprising list of users and programs having access to the sensitive data by inspecting application codes that are used for downstream data protection and governance operations, such as data masking, data encryption, data monitoring, data mapping, data tokenization, data retirement, etc.

OBJECTIVES OF THE EMBODIMENTS HEREIN

A primary object of the embodiments herein is to develop a computer-implemented method and the system to provide a platform for discovering a majority of sensitive data across various data sources including relational databases, hierarchical databases, file systems, text, documents, external files, complex data locations such as complex columns, composite data locations such as composite columns, binary large objects (BLOBs), character large objects (CLOBs), key value pairs, temporary tables such as plum tom tables created by a database, unvalidated fields, structured data sources, unstructured data sources, cloud data sources, big data sources, etc., and applications, with minimal false positives.

Another object of the embodiments herein is to develop a computer-implemented method and the system to provide a data classification centric discovery process based on metadata of an application using different data classifications.

Yet another object of the embodiments herein is to develop a computer-implemented method and the system to scan database tables, columns, rows, and application codes based on unique data classifications to provide results pertaining to the location and access of sensitive data.

Yet another object of the embodiments herein is to develop a computer-implemented method and the system to configure unique data classifications based on definitions of the unique data classifications received from a user device through a graphical user interface (GUI) or retrieved from a data store, and wherein the unique data classifications are predefined or configured by a user of the user device.

Yet another object of the embodiments herein is to develop a computer-implemented method and the system to identity reasons and attributes for sensitive data classification and to distinguish the data classifications with having the same patterns.

Yet another object of the embodiments herein is to develop a computer-implemented method and the system to go beyond parsing text to execute multilevel matching based on values, patterns, and application logic by configuring a scanning pathway for scanning the accessed data based on a selected unique data classification, and wherein the scanning pathway defines a sequence of one or more matching operations to be performed on the data based on the selected unique data classification.

Yet another object of the embodiments herein is to develop a computer-implemented method and the system to provide a graphical user interface for selecting one or mom matching operations selected from a group consisting of a master data field match operation, multiple dictionary match operations, a code match operation, multiple pattern match operations, and multiple exact data match operations, to be performed on the data based on the selected unique data classification.

Yet another object of the embodiments herein is to develop a computer-implemented method and the system to validate results of the pattern matching operations with respect to master data fields, or master validation functions, or any combination thereof.

Yet another object of the embodiments herein is to develop a computer-implemented method and the system to provide a graphical user interface for selecting a scan level selected from a group consisting of a full scan, a sample scan, and an incremental scan for executing the match operations in the configured scanning pathway.

Yet another object of the embodiments herein is to develop a computer-implemented method and the system to score the data based on a result of each matching operation executed in the configured scanning pathway.

Yet another object of the embodiments herein is to develop a computer-implemented method and the system to validate scores assigned to the data based on threshold criteria, and wherein the execution of the selected match operations is terminated when an assigned score is equal to a maximum threshold value.

Yet another object of the embodiments herein is to develop a computer-implemented method and the system to determine/judge a status/presence of sensitive data as a true positive or a false positive, based on the validated scores of the data.

Yet another object of the embodiments herein is to develop a computer-implemented method and the system to identify application codes that are operated on the determined sensitive data.

Yet another object of the embodiments herein is to develop a computer-implemented method and the system to generates discovery of metadata comprising information of users and programs that access the determined estimated sensitive data by inspecting the identified application codes.

Yet another object of the embodiments herein is to develop a computer-implemented method and the system to generate a sensitive data discovery map report comprising locations of the determined estimated sensitive data and the generated discovery metadata, and wherein the generated sensitive data discovery map report is configured for an extended use in subsequent or downstream data protection and governance operations, such as data masking, data encryption, data monitoring, data mapping, data tokenization, data retirement, etc.

The objects disclosed above will be realized and achieved at least by the elements, features, and combinations particularly pointed out in the claims. The objects disclosed above have outlined, rather broadly, the features of the computer-implemented method and the system disclosed herein in order that the detailed description that follows may be better understood. The objects disclosed above are not intended to determine the scope of the claimed subject matter and are not to be construed as limiting of the computer-implemented method and the system disclosed herein. Additional objects, features, and advantages of the computer-implemented method and the system disclosed herein are disclosed below. The objects disclosed above, which are believed to be characteristic of the computer-implemented method and the system disclosed herein, both as to its organization and method of operation, together with further objects, features, and advantages, will be better understood and illustrated by the technical features broadly embodied and described in the following description when considered in connection with the accompanying figures.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many charges and modifications may be made within the scope of the embodiments herein without departing from the spirit thereof, and the embodiments herein include all such modifications.

This summary is provided to introduce a selection of concepts in a simplified form that are further disclosed in the detailed description. This summary is not intended to determine the scope of the claimed subject matter.

According to one embodiment herein, the computer-implemented method and the sensitive data discovery engine (SDDE) address the above-recited need for discovering substantial sensitive data in source systems spinning across multiple similar and variant data sources and applications. The SDDE implements a discovery process based on metadata of an application using different data classifications to further generate a template or a data map, herein referred to as a "sensitive data discovery map report", that is a result of the discovery process. Moreover, the computer-implemented method and the SDDE disclosed herein address the above-recited need for configuring data classifications of direct and potential customer identifying data for allowing flexible definitions. Furthermore, the computer-implemented method and the SDDE disclosed herein address the above-recited need for generating metadata comprising which users and programs have access to the sensitive data by inspecting application codes that can be used for downstream data protection and governance operations, for example, data masking, data encryption, data monitoring, data mapping, data tokenization, data retirement, etc. The computer-implemented method and the SDDE disclosed herein configure pathways and implement a scorecard mechanism to identify sensitive data.

According to one embodiment herein, the computer-implemented method employs at least one processor configured to execute computer program instructions for discovering substantial sensitive data in source systems spanning across multiple similar and variant data sources and applications. The similar and variant data sources comprise, for example, relational databases, hierarchical databases, file systems, text, documents, external files, complex data locations, composite data locations, unvalidated fields, binary large objects, character large objects, key value pairs, phantom tables, structured data sources, unstructured data sources, cloud data sources, big data sources, etc. In the computer-implemented method disclosed herein, the SDDE accesses data from multiple similar and variant data sources and applications. The SDDE configures unique data classifications of the accessed data based on definitions for the unique data classifications received from a user device via a graphical user interface (GUI) provided by the SDDE or retrieved from a data store. The unique data classifications are predefined or configurable via the GUI. The SDDE configures a scanning pathway for scanning the accessed data based on a selected one of the unique data classifications. The scanning pathway defines a sequence of one or more of match operations to be performed on the accessed data for the selected unique data classification. The match operations comprise, for example, a master data field match operation, multiple dictionary match operations, a code match operation, multiple pattern match operations, and multiple exact data match operations. The SDDE receives a selection of a scan level, for example, a full scan, or a sample scan, or an incremental scan, for performing one or more of the match operations through the GUI. The SDDE executes the match operations in the configured scanning pathway on the accessed data for the selected unique data classification based on the received selection of the scan level.

According to one embodiment herein, the SDDE scores the accessed data based on a result of each of the executed match operations in the configured scanning pathway. The SDDE determines sensitive data from the scored data, for example, within 2 or 3 iterations. In an embodiment, the SDDE classifies the accessed data as sensitive data, or potentially sensitive data, or not sensitive data based on the executed match operations in the configured scanning pathway. The SDDE identifies application codes that operate on the determined sensitive data. The SDDE generates discovery metadata comprising information of users and programs that access the determined sensitive data by inspecting the identified application codes. In an embodiment, the generated discovery metadata further composes historical data related to the determination of the sensitive data and relationships of the users with the sensitive data. The SDDE generates a sensitive data discovery map report comprising locations of the determined sensitive data and the generated discovery metadata. The generated sensitive data discovery map report is configured for extended use in subsequent or downstream data protection and governance operations. The downstream data protection and governance operations for which the generated sensitive data discovery map report is used comprise, for example, data masking, data encryption, data monitoring, data mapping, data tokenization, data retirement, etc.

According to one embodiment herein, the SDDE validates scores assigned to the accessed data during the step of scoring the accessed data against threshold criteria. The threshold criteria comprise a minimum threshold and a maximum threshold. The minimum threshold is configured to eliminate false positives during the execution of the match operations in the configured scanning pathway. The maximum threshold is configured to terminate the execution of the match operations in the configured scanning pathway. In another embodiment, the SDDE validates results of the pattern match operations against master data fields, or master validation functions, or any combination thereof. In another embodiment, the exact data match operations comprise matching the accessed data against column values, or master data values defined in master data tables, or a preconfigured repository of values, or any combination thereof.

According to one embodiment herein, the SDDE scans tables, columns, and rows present in a database based on predefined data classifications comprising, for example, a national identifier, a first name, a last name, a credit card number and the other user defined data classifications. Subsequently, the SDDE provides an output pertaining to a location of sensitive data in the database. Furthermore, the SDDE provides data security by scanning application code and user behaviour, thereby delivering information about application programs and users who have access to the sensitive data. The SDDE, therefore, provides sensitive data intelligence comprising the locations of the sensitive data and who has access to the sensitive data based on predefined and configurable unique data classifications of the accessed data. To locate sensitive data, the SDDE utilizes pathways and scorecards to improve the discovery process and detect the sensitive data, for example, within 2 or 3 iterations. In an embodiment, the SDDE also identifies complex columns, free text fields, description fields, etc., using methods comprising, for example, master data identification, dictionary match, code match, and pattern validation.

According to an embodiment herein, the match operation to be used for scanning and matching with respective data types is determined based on metadata of an application and data classifications. Once the sensitive data and access information are identified, the sensitive data is further used for masking, monitoring, retirement, and other data protection and governance operations. According to another embodiment herein, the SDDE detects sensitive data present in databases and applications comprising, for example, application forms, pages, queries, reports, etc., with the match operations and validations to identify usage of sensitive data. Moreover, the SDDE creates a data map of sensitive data along with the history of sensitive data discovery and a user's relationship with the sensitive data in the sensitive data discovery map report. Furthermore, the discovery metadata generated by the SDDE identifies the sensitive data that is associated with data relationships. The SDDE with enhanced pathways and scorecards support multiple data classifications with the ability to add custom data classifications.

According to one embodiment herein, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The foregoing summary, as well as the following detailed description, is better understood when read in conjunction with the appended drawings. For illustrating the computer-implemented method and the system disclosed herein, exemplary constructions of the computer-implemented method and the system are shown in the drawings. However, the computer-implemented method and the system disclosed herein are not limited to the specific methods and components disclosed herein. The description of a computer-implemented method step or a component referenced by a numeral in a drawing is applicable to the description of that method step or component shown by that same numeral in any subsequent drawing herein.

FIGS. 2-3 illustrate a graphical user interface provided by a sensitive data discovery engine for configuring a scanning pathway for scanning data based on a selected unique data classification, according to an embodiment herein.

FIG. 8 illustrates a graphical user interface provided by the sensitive data discovery engine showing results of a match operation that facilitated determination of sensitive data in an invalidated field, according to an embodiment herein.

FIGS. 9A-9B illustrate a table showing details of a scan performed on data in a database, according to an embodiment herein.

FIG. 10 illustrates a table showing definitions of unique data classifications and threshold criteria configured for validating scores assigned to data in a database, according to an embodiment herein.

FIGS. 11A-11B illustrate a table showing locations of sensitive data deemed as true positives, determined from a scan performed on data in a database, according to an embodiment herein.

FIGS. 12A-12B illustrate a table showing columns of tables tagged as potentially sensitive and requiring further analysis and investigation, according to an embodiment herein.

FIGS. 13-14 illustrate tables showing results of identification of sensitive data in complex columns, according to an embodiment herein.

FIGS. 15A-15C illustrate a table defining a sensitive data discovery map report comprising locations of the sensitive data and the discovery metadata generated by the sensitive data discovery engine, according to an embodiment herein.

DETAILED DESCRIPTION

Various aspects of the present disclosure may be embodied as a system, a method, or a non-transitory computer readable storage medium having one or more computer readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit" or a "unit".

Figure 1:
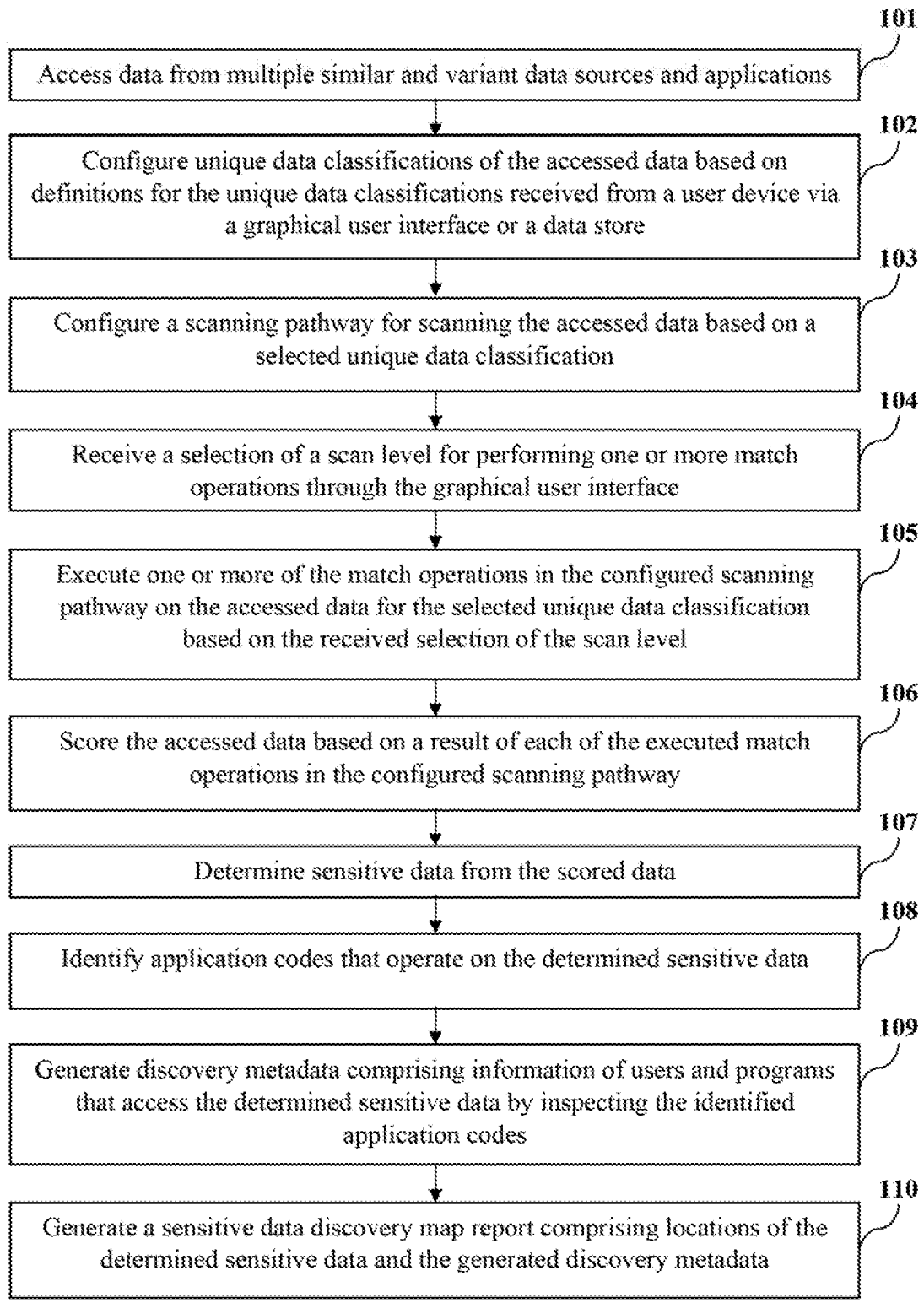
FIG. 1 illustrates a data classification centric method for discovering substantial sensitive data in source systems spanning across multiple similar and variant data sources and applications, according to an embodiment herein.

FIG. 1 illustrates a data classification centric method for discovering substantial sensitive data in source systems spanning across multiple similar and variant data sources and applications, according to an embodiment herein. The computer-implemented method disclosed herein employs a sensitive data discovery engine (SDDE) and at least one processor configured to execute computer program instructions for discovering substantial sensitive data in source systems spanning across multiple similar and variant data sources and applications. The sensitive data comprises, for example, personal identification information, financial information, healthcare information, etc. The SDDE accesses 101 data from multiple similar and variant data sources and applications, in an embodiment, the SDDE generates metadata about the data source containing the accessed data. The generated metadata comprises metadata related to the data source, for example, table structure, data dictionary, file metadata such as name, file type, etc., and utilizes the generated metadata during execution of match operations. The similar and variant data sources comprise, for example, relational databases, hierarchical databases, file systems, text, documents, external files, complex data locations, composite data locations, unvalidated fields, binary large objects, character large objects, key value pairs, phantom tables, structured data sources, unstructured data sources, cloud data sources, big data sources, etc. The SDDE receives administration and system privileges to access the data from multiple similar and variant data sources and applications. The applications accessed by the SDDE comprise, for example, application forms, pages, queries, reports, etc. In an embodiment, the SDDE categorizes the data sources that are potentially sensitive and identifies the sensitive data there within.

According to an embodiment herein, the SDDE configures 102 unique data classifications of the accessed data based on definitions for the unique data classifications received from a user device via a graphical user interface (GUI) provided by the SDDE or retrieved from a data store. The unique data classifications are predefined or configurable via the GUI. The unique data classifications comprise, for example, a national identifier, credit card number, bank account information, first name, last name, other names, address, phone, electronic mail (email) addresses, internet protocol (IP) addresses, date of birth, salary, nationality, religion, home country, home city, airport code, insurance category, people groups, grades, positions, etc. In an embodiment, the unique data classifications are predefined by the application logic. The application logic defines the constitution of sensitive data in source systems spanning across multiple similar and variant data sources and applications. The SDDE configures unique data classifications of direct customer-identifying dam comprising, for example, first name, last name, email address, phone number, postal address, etc. The SDDE also configures unique data classifications of indirect customer-identifying data comprising, for example, passport identification number, account number, social security number, internet protocol address, company information, etc. The SDDE also configures unique data classifications of potential customer-identifying data comprising, for example, birth information, language, marital status, credit rating, gender, etc. The SDDE preconfigures unique data classifications of direct, indirect and potential customer-identifying data.

According to an embodiment herein, the unique data classifications are configured through the GUI provided by the SDDE. In this embodiment, a user enters the unique data classifications through the GUI rendered on a user device. The SDDE receives the entered unique data classifications from the user device via the GUI. The unique data classifications input to the SDDE are transformed, processed, and executed by an algorithm in the SDDE. The SDDE renders the data classifications configurable to allow flexible definitions of the data classifications. The SDDE distinguishes the data classifications having the same patterns. The SDDE implements classification methods based on patterns that support validation functions and validations based on master data. For data classifications that have the same patterns, the SDDE runs validations to identify the type of data. For example, a credit card number would have 16 digits and would pass a checksum validation. Any other 16-digit number would not pass the checksum validation. In an embodiment, the SDDE executes the Luhn algorithm, also referred to as a modulus 10 algorithm, for validating identification numbers, for example, credit card numbers, international mobile equipment identity (IMEI) numbers, national provider identifier numbers, social insurance numbers, social security numbers, etc., that constitute sensitive data in accordance with the application logic. In an embodiment, the SDDE renders a GUI for allowing a user to enter multiple variations of a pattern, for example, NNNN-NNNN-NNNN, NNNNNNNNNNNNNNNN, NNNN NNNN NNNN NNNN, NNNN/NNNN/NNNN/NNNN, etc. The SDDE allows users to configure the patterns while also having an option to include or exclude certain patterns as required via the GUI. In addition to patterns, the SDDE inspects the source code of the applications to configure unique data classifications. The SDDE also scans source code to identity difficult-to-find locations, for example, temporary tables, backup tables, etc., containing sensitive data. The SDDE therefore supports the configuration of unique data classifications and allows addition of custom data classifications.

According to an embodiment herein, the SDDE configures 103 a scanning pathway for scanning the accessed data based on a selected one of the unique data classifications. The scanning pathway defines a sequence of ore or more match operations to be performed on the accessed data for the selected unique data classification. The scanning pathway configures an order of execution of the match operations by the SDDE The match operations comprise, for example, a master data field match operation, multiple dictionary match operations, a code match operation, multiple pattern match operations, and multiple exact data match operations. For facilitating a master data field match operation, a user, for example, an application owner or a customer flags an internal repository containing sensitive data as a master data table. The matter data field match operation comprises matching the accessed data against fields and values defined in the master data table. In the master data field match operation, the SDDE matches the accessed data against fields, for example, column names, and values defined in the master data table. If a match of the accessed data with the sensitive data contained in the master data table is found and if a score assigned to the accessed data exceeds a predefined threshold, the SDDE deems the accessed data as sensitive data.

According to an embodiment herein, the SDDE configures a dictionary of patterns or strings, or in on embodiment, retrieves available data dictionaries for performing the dictionary match operations. In the dictionary match operations, the SDDE determines all the occurrences of any pattern or string of the dictionary in the accessed data. The dictionary match operations comprise matching the accessed data against primary key and foreign key references, matching the accessed data against exact column names, and matching the accessed data against similar column names. The dictionary match operations comprise, for example, "Dictionary Match: Relationship", "Dictionary Match: Column Name", and "Dictionary Match Column Name Expression". In the dictionary match operation, "Dictionary Match: Relationship", the SDDE matches the accessed data against primary key and foreign key references. In the dictionary match operation, "Dictionary Match: Column Name", the SDDE matches the accessed data against the exact column names defined. In the dictionary match operation, "Dictionary Match: Column Name", the SDDE scans a heading of a column to identify the type of data contained within the column. For example, the SDDE determines that a column with a heading "Nat_Iden" or other similar variations are likely to contain national identifiers and therefore classify the data contained in the column as sensitive data. However, sometimes sensitive data can be present in columns that are flagged as "not sensitive" by a simple column match. In this case, the SDDE performs a pattern match operation or a code match operation to verify the sensitivity of the column. In the dictionary match operation, "Dictionary Match: Column Name Expression", the SDDE matches the accessed data against like or similar column names defined. In addition to performing dictionary match operations, the SDDE performs matching based on values and application logic. For example, SDDE will make use of the validation function called luhn checksum calculation along with dictionary match operations to identify credit card numbers.

According to an embodiment herein, the code match operation comprises matching the accessed data against database objects based on master data fields. The database objects refer to defined objects in a database that is used to store or reference data. In the code match operation, the SDDE matches the accessed data against database objects based on master data fields In the pattern match operations, the SDDE determines the presence of patterns, for example, in the form of tress structures or sequence patterns such as text strings, in the accessed data. For example, for a data classification such as credit card number, which is a 16-digit number, the SDDE includes all possible pattern combinations NNNN-NNNN-NNNN-NNNN, NNNNNNNNNNNNNNNN, NNNN NNNN NNNN NNNN, NNNN/NNNN/NNNN/NNNN, etc., in the pattern match operations to capture all such patterns. The pattern combinations are configurable via the GUI. The pattern match operations comprise matching the accessed data against character-based patterns. The pattern match operations comprise, for example, "Pattern Match", "Pattern Match: Validated with Functions", and "Pattern Match: Validated with Master Data". In the pattern match operation, "Pattern Match", the SDDE matches the accessed data against patterns defined like U—Uppercase, L—Lowercase, and N—Numeric. In an embodiment, the SDDE validates results of the pattern match operations against master data fields, or master validation functions, or any combination thereof. The SDDE performs the validations based on the validation functions or by matching with master data. When the pattern match operation alone cannot be used to confidently establish whether the accessed data is sensitive or not, the SDDE uses the pattern much operations, "Pattern Match Validated with Functions" and/or "Pattern Match Validated with Master Data".

According to an embodiment herein, the pattern match operation, "Pattern Match: Validated with Functions", depends on the configured scanning pathway. In the pattern match operation, "Pattern Match: Validated with Functions", the SDDE validates the results of the pattern match operation, "Pattern Match", against validation functions configured by the SDDE. The SDDE utilizes multiple types of validation functions in conjunction with the results of the pattern match operations. For example, to validate a 16-digit credit card number 9876 5432 1012 3456, which could be any number, the SDDE implements a validation function defined by the Luhn algorithm. In another example, since credit cards and debit cards follow a set pattern and associated conditions, the SDDE validates a Mastercard number by determining whether the number begins with the numbers "51" through "55". The SDDE configures such validation functions in the scanning pathway while searching for credit card number, and debit card numbers. The SDDE performs the pattern match operation, "Pattern Match: Validated with Functions", when master data fields are not available across the similar and variant data sources. The pattern match operation, "Pattern Match: Validated with Master Data", depends on the configured scanning pathway. In the pattern match operation, "Pattern Match Validated with Master Data", the SDDE validates the results of the pattern match operation, "Pattern Match", against master data fields to minimize or eliminate false positives. As used herein, "false positive" refers to an error in data reporting where a result of a match operation falsely indicates a presence of sensitive data.

According to an embodiment herein, the exact data match operations comprise matching the accessed data against column valves, or master data values defined in master data tables, or a preconfigured repository of values or any combination thereof. In the exact data match operations, the SDDE can also search for a specific string value. For example, if a particular employee identifier (ID) needs to be discovered within a data source for subsequent deletion, the SDDE can be configured to scan the data source to identify all data locations where the input employee ID has been entered. The exact data match operations comprise, for example, "Exact Data Match: Master Data", "Exact Data Match: Repository", and "Exact Data Match: Entered Value". In the exact data match operation, "Exact Data Match: Master Data", the SDDE matches the accessed data against master data values defined in a master data table. In the exact data match operation, "Exact Data Match: Repository", the SDDE matches the accessed data against a repository of values created by the SDDE. In the exact data match operation, "Exact Data Match: Entered Value", the SDDE matches the accessed data against column values defined in the exact data match operation.

According to an embodiment herein, the SDDE renders a graphical user interface (GUI) on a user device to allow a user to select one or more match operations. The SDDE receives the selected match operations via the GUI and configures the scanning pathway for the selected unique data classifications. For example, the SDDE configures a scanning pathway defining a sequence of a master data field match operation, a dictionary match operation based on a column name, another dictionary match operation based on a column name expression, a pattern match, and a pattern match validated with functions for discovery of a national identifier. The scanning pathway that defines the sequence of match operations to be performed for discovering the sensitive data is fully configurable and is dependent on the data classification to be discovered. For example, the SDDE configures the following scanning pathway to identify the data classification, "National Identifier": (1) Master Data Field; (2) Dictionary Match: Column Name; (3) Dictionary Match: Column Name Expression; (4) Pattern Match; and (5) Pattern Match: Validated with Functions. In another example, the SDDE configures the following scanning pathway to identify the data classification, "first name": (1) Master Data Field and (2) Dictionary Match: Column Name. In an embodiment, the SDDE configures a predefined sequence of the match operations for a default data classification based on past operations.

According to an embodiment herein, the SDDE receives 104 a selection of a scan level for performing the match operations through the GUI rendered by the SDDE on the user device. The scan level comprises a full scan of the entirety of the accessed data, a sample scan of a predefined number of data locations in the similar and variant data sources and applications, and an incremental scan of newly added data locations. As executing the match operations throughout the similar and variant data sources and applications containing massive volumes of data is time and resource intensive, the SDDE provides flexibility in the discovery of sensitive data by allowing users to configure the scan level for performing the match operations. The SDDE allows a user to select a full scan, a sample scan, or an incremental scan via the GUI. Underlying databases typically undergo periodic updates comprising, for example, additions of rows and additions of columns and or tables. The additions of rows, in general, do not impact the sensitivity of the columns. To overcome the difficulty in executing the selected match operations on the entirety of the accessed data containing old data and new data each time the underlying database of any application is updated, the incremental scan allows the SDDE to execute the selected match operations only on the newly added data locations, for example, the newly added columns, files, or oilier data sources. In the incremental scan, the SDDE scans and classifies only the newly added data locations.

According to an embodiment herein, the SDDE executes 105 the selected match operations in the configured scanning pathway on the accessed data for the selected unique data classification based on the received selection of the scan level. The SDDE executes the match operations selected, for example, from a master data field match operation, multiple dictionary match operations, a code match operation, multiple pattern match operations, and multiple exact data match operations in the configured scanning pathway on the accessed data for the selected unique data classification. The SDDE executes the selected match operations sequentially as defined in the configured scanning pathway. If the user selects the full scan via the GUI, the SDDE executes the selected match operations on the entirety of the accessed data within the source systems spanning across multiple similar and variant data sources and applications. If the user selects the sample scan via the GUI, the SDDE executes the selected match operations on a predefined number of data locations, for example, rows or columns within a data source. If the user selects the incremental scan via the GUI, the SDDE executes the selected match operations on newly added columns, files, or other data sources. In an embodiment, the SDDE allows users to reconfigure the scanning pathway and reorder the sequence of execution of the selected match operations via the GUI. The users may also deselect one or more of the match operations for execution in the scanning pathway. The SDDE provides a check or uncheck option on the GUI to allow the users to include or exclude a match operation in the scanning pathway. The SDDE therefore scans database tables, columns and rows based on defined unique data classifications, for example, national identifier, first name, last name, credit card number, etc., and provides results pertaining to the location of sensitive data. The method of scanning is data classification centric with scanning pathways and a scorecard mechanism.

According to an embodiment herein, the SDDE scores 106 the accessed data based on a result of each of the executed match operations in the configured scanning pathway. During scoring, the SDDE implements a scorecard mechanism to assign a numeric value or a score to a data location, for example, a column based on the results of the executed match operations. As used herein, the term "score" refers to accumulated weightage provided to the accessed data based on the result of each of the selected match operations in the configured scanning pathway executed to discover sensitive data. In an embodiment, the SDDE validates scores assigned to the accessed data during the step of scoring the accessed data against threshold criteria. The threshold criteria comprise a minimum threshold and a maximum threshold. In an embodiment, the SDDE receives the threshold criteria from a user device via a graphical user interface (GUI) provided by the SDDE The user may enter values for the minimum threshold and the maximum threshold via the GUI.

According to an embodiment herein, the SDDE configures the minimum threshold to eliminate false positives during the execution of the selected match operations in the configured scanning pathway. The SDDE validates the assigned scores against the minimum threshold to eliminate false positives. The SDDE configures the maximum threshold to terminate the execution of the selected match operations in the configured scanning pathway when a score representing a true positive is established. As used herein, "true positive" refers to a result of a match operation indicating an accurate presence of sensitive data. The SDDE validates the assigned scores against the maximum threshold to terminate the execution of the selected match operations in the configured scanning pathway when the assigned scores reach the maximum threshold. That is, the SDDE executes a subsequent match operation in the configured scanning pathway, only if the score assigned to the accessed data for a current match operation does not meet the maximum threshold. The SDDE sequentially executes the selected match operations in the configured scanning pathway, until the maximum threshold is reached, and terminates execution of the remaining match operations in the configured scanning pathway when the maximum threshold is reached In an example, the SDDE configures the minimum threshold to be 60 and a maximum threshold to be 100. The SDDE configures the maximum threshold to be greater than or equal to the total score. The scorecard mechanism implemented by the SDDE allows optimal validation of the results of the match operations.

According to an embodiment herein the SDDE, determines 107 sensitive data from the scored data, for example, within 2 or 3 iterations In the determination of the sensitive data from the scored data, the SDDE classifies the accessed data as sensitive data, or potentially sensitive data, or not sensitive data based on the executed match operations in the configured scanning pathway. If the score assigned to the accessed data meets the minimum threshold, the SDDE selects classifies that data location, for example, a table or a column, containing the accessed data as sensitive. If the score assigned to the accessed data does not meet the minimum threshold, the SDDE classifies the data location containing the accessed data as a false positive. The SDDE validates each score against the maximum threshold. If the score assigned to the accessed data reaches the maximum threshold, the SDDE terminates the execution of the selected match operations for that particular data classification, thereby determining the accessed data as a true positive. The score assigned to accessed data for each of the selected match operations should not exceed the maximum threshold. The SDDE configures the scanning pathway defining the sequence of the selected match operations to be performed on the accessed data to scan and flag a data location, for example, a column as sensitive to ensure optimal performance for classifying the accessed data as sensitive, potentially sensitive, or not sensitive, thereby minimizing false positives and ensuring a comprehensive discovery of sensitive data. In addition to determining the sensitive data from the scored data, the SDDE renders the locations of the sensitive data in source systems spanning across multiple similar and variant data sources and applications that are identified using the configured scanning pathway and the scorecard mechanism.

According to an embodiment herein, the SDDE identifies 108 application codes that operate on the determined sensitive data. Apart from patterns, the SDDE also inspects source code of applications to determine whether the accessed data is sensitive or not. The SDDE analyses structured query language (SQL) code to determine what operations are being performed, particularly those that involve data locations, for example, tables and columns, containing sensitive data. On determining the data locations, for example, tables and columns that are sensitive, the SDDE identifies actions concerning these data locations. The SDDE scans application code and user information comprising user behavioural information, and determines what users and programs access the sensitive data. The SDDE provides details of the application programs accessing the sensitive data and users who has access the sensitive data. The SDDE generates 109 discovery metadata comprising information of users and programs that access the determined sensitive data by inspecting the identified application codes. In an embodiment, the generated discovery metadata further comprises historical data related to the determination of the sensitive data and relationships of the users with the sensitive data. The generated discovery metadata provides a complete result of where the sensitive data is, how the sensitive data is being used, and who or what has access to the sensitive data. The generated discovery metadata allows maintenance of data relationships and referential integrity. The SDDE, therefore, provides sensitive data intelligence comprising the locations of the sensitive data and who has access to the sensitive data based on predefined and configurable unique data classifications of the accessed data.

According to an embodiment herein, the SDDE generates 110 a sensitive data discovery map report comprising locations of the determined sensitive data and the generated discovery metadata. The locations of the determined sensitive data comprise, for example, schema, tables, columns, complex columns, rows, free text fields, description fields, invalidated fields, key value pairs, etc. The sensitive data discovery map report provides a data map of sensitive data with complete information of the discovery of the sensitive data and relationships present. The generated sensitive data discovery map report is configured for extended use in downstream data protection and governance operations. The downstream data protection and governance operations for which the generated sensitive data discovery map report is used comprise, for example, data masking, data encryption, data monitoring, data mapping, data tokenization, data retirement, etc. The SDDE generates metadata within source systems spanning across multiple similar and variant data sources and applications for enterprise data protection and governance operations. The SDDE discovers sensitive data by inspecting data and metadata with respect to the data classification and by introspecting code to determine which users and what programs access sensitive data. The discovery metadata generated by the SDDE is used for downstream data protection and governance operations. The results of running the SDDE on the data sources and applications can be used, for example, for data mapping, data lineage related uses, and other data protection and governance operations. In an embodiment, the SDDE performs the generation of the discovery metadata and the sensitive data discovery map report simultaneously or in parallel.

According to an embodiment herein, the SDDE disclosed herein implements one or more specific computer programs for discovering substantial sensitive data in source systems spanning across multiple similar and variant data sources and applications. The computer-implemented method disclosed herein improves the functionality of a computer and provides an improvement in data security technology related to discovering substantial sensitive data in source systems spanning across multiple similar and variant data sources and applications as follows. On implementing the method disclosed herein, the SDDE configures scanning pathways and implements a scorecard mechanism to identify a majority of the sensitive data, for example, within 2 or 3 iterations. The SDDE discovers sensitive data even in difficult to find locations, for example, complex columns, free text fields, description fields, invalidated fields, binary large objects, character large objects, key value pairs, phantom tables, etc. The SDDE identifies complex columns, free text fields, description fields, etc., using the match operations disclosed above.

According to an embodiment herein, in addition to source systems spanning multiple similar and variant data sources and applications, the SDDE further scans code to identify which users or programs have access to the sensitive data. The SDDE initiates the discovery process by interpreting the metadata of a database. The SDDE then scores the accessed data, and determines the sensitive data from the scored data. The SDDE validates the scores assigned to the accessed data during the step of scoring the accessed data against threshold criteria to eliminate false positives during the execution of the match operations in the configured scanning pathway and to terminate the execution of the match operations in the configured scanning pathway on determination of a true positive. The SDDE then, through the use of separate and autonomous computer programs, identities application codes that operate on the determined sensitive data, generates discovery metadata comprising information of users and programs that access the determined sensitive data by inspecting the identified application codes, and generates a sensitive data discovery map report comprising locations of the determined sensitive data and the generated discovery metadata. The sensitive data discovery map report is then distributed across an enterprise for use in downstream data protection and governance operations, for example, data masking, data encryption, data monitoring, data mapping, data tokenization, data retirement, etc.

According to an embodiment herein, the focus of the computer-implemented method and the system is on an improvement to data security technology and computer functionalities, and not on tasks for which a generic computer is used in its ordinary capacity. Rather, the computer-implemented method and the system disclosed herein are directed to a specific improvement to the way the processors in the system operate, embodied in, for example, configuring unique data classifications of the accessed data, configuring a scanning pathway for scanning the accessed data based on the associated metadata and a selected unique data classification, receiving a selection of a scan level; executing the selected match operations in the configured scanning pathway on the accessed data for the selected unique data classification based on the received selection of the scan level, scoring the accessed data based on a result of each of the executed match operations in the configured scanning pathway, determining sensitive data from the scored data; identifying application codes that operate on the determined sensitive data, generating discovery metadata comprising information of users and programs that access the determined sensitive data by inspecting the identified application codes; and generating a sensitive data discovery map report comprising locations of the determined sensitive data and the generated discovery metadata for extended use in downstream data protection and governance operations.

According to an embodiment herein, in the computer-implemented method, the design and the flow of data and interactions between the SDDE and the similar and variant data sources and applications are deliberate, designed, and directed. The interactions between the SDDE and the similar and variant data sources and applications allow the SDDE to discover substantial sensitive data in source systems spinning across multiple similar and variant data sources and applications. The steps performed by the SDDE disclosed above requires ten or more separate computer programs and subprograms, the execution of which cannot be performed by a person using a generic computer with a generic program. The steps performed by the SDDE disclosed above are tangible, provide useful results, and are not abstract. The hardware and software implementation of the system disclosed herein comprising the SDDE and one or more processors is an improvement in computer related and data security technology.

FIGS. 2-3 illustrates a graphical user interface (GUI) 201 provided by the sensitive data discovery engine (SDDE) for configuring a scanning pathway for scanning data based on a selected unique data classification, according to an embodiment herein. The SDDE renders the GUI 201 on a user device to allow a user to configure a scanning pathway for scanning data based on a selected unique data classification. In an example, for discovering national identifiers in source systems spanning across multiple similar and variant data sources and applications, the SDDE renders the GUI 201 illustrated in FIG. 2, to allow a user to configure a scanning pathway for scanning data based on the data classification, "National Identifier". In another example, for discovering a first name in source systems spanning across multiple similar and variant data sources and applications, the SDDE renders the GUI 201 exemplarily in FIG. 3, to allow a user to configure a scanning pathway for scanning data based on the data classification, "First Name". The SDDE displays a list of match operations, for example, "Master Data Field", "Dictionary Match: Relationship", "Code Match", "Dictionary Match: Column Name", "Dictionary Match: Column Name Expression", "Pattern Match", "Pattern Match: Validated with functions", "Pattern Match: Validated with master data", "Exact Data Match: Tables", "Exact Data Match: Repository", and "Exact Data Match: Entered value" on the GUI 201 as illustrated in FIGS. 2-3.

According to un embodiment herein, the SDDE allows the user to enter a score for each of the match operations, select one or more match operations, and enter a sequence for the selected match operations to be performed on the data for the unique data classification into user interface elements, for example text fields 201a checkboxes 201b, and text fields 201c provided on the GUI 201 respectively. The SDDE also specifies that the match operations, "Pattern Match: Validated with functions" and "Pattern Match: Validated with master data", can be selected only if the match operation, "Pattern Match", is selected. In an example, for configuring the scanning pathway for discovering the unique data classification "National Identifier", the user enters the scores 100, 60, 60, 60, 20, 60, 30, 20, 20, 60, and 60 adjacent to the names of the match operations "Master Data Field", "Dictionary Match: Relationship", "Code Match", "Dictionary Match: Column Name", "Dictionary Match: Column Name Expression", "Pattern Match", "Pattern Match: Validated with functions", "Pattern Match: Validated with master data", "Exact Data Match: Tables", "Exact Data Match: Repository", and "Exact Data Match: Entered value", respectively, in the text fields 201a on the GUI 201 as exemplarily illustrated in FIG. 2. The user also selects "Master Data Field", "Dictionary Match: Column Name", "Dictionary Match: Column Name Expression", "Pattern Match", and "Pattern Match: Validated with functions" by checking the associated checkboxes 201b on the GUI 201 as exemplarily illustrated in FIG. 2.

According to an embodiment herein, for configuring the scanning pathway for discovering the unique data classification "First Name", the user enters the scores 100, 100, 60, 60, 100, 60, 30, 100, 60, 60, and 60 adjacent to the names of the match operations "Master Data Field", "Dictionary Match: Relationship", "Code Match", "Exact Data Match: Tables", "Exact Data Match Repository", "Dictionary Match: Column Name", "Dictionary Match: Column Name Expression", "Exact Data Match: Entered value" "Pattern Match", "Pattern Match: Validated with master data", and "Pattern Match: Validated with functions", respectively, in the text fields 201a on the GUI 201 as illustrated in FIG. 3. The user also selects "Master Data Field" and "Dictionary Match: Column Name" by checking the associated checkboxes 201b on the GUI 201 as illustrated in FIG. 3. The user also enters the sequence for the selected match operations to be performed on the data for the selected unique data classifications "National Identifier" and "First Name" in the text fields 201c on the GUI 201 as illustrated in FIGS. 2-3. On receiving the selections from the user via the GUI 201, the SDDE configures the scanning pathway for scanning the data based on the selected unique data classification "National Identifier" or "First Name".

Figure 4:
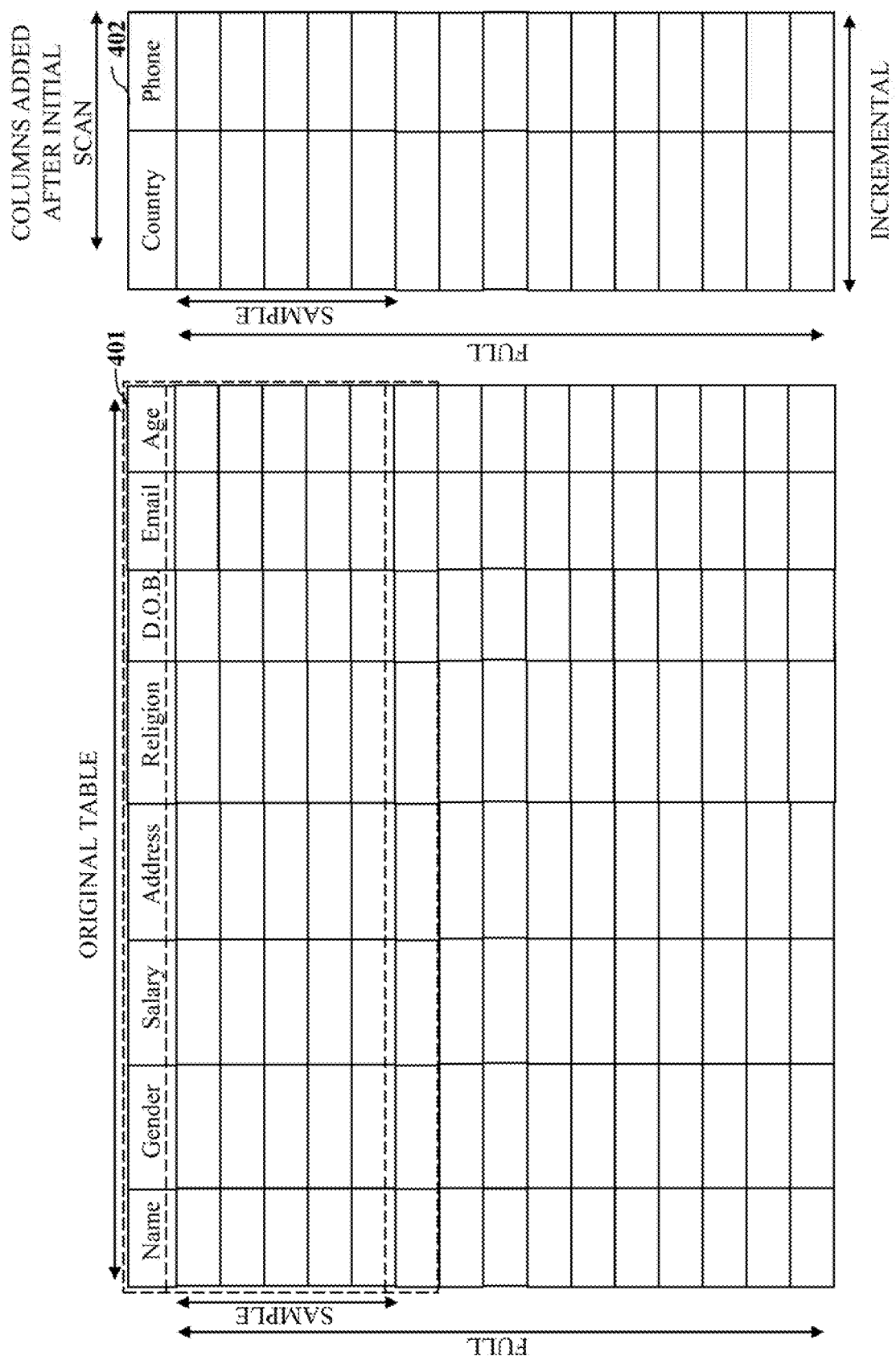
FIG. 4 illustrates a table showing implementation of a scan level for performing selected match operations on data contained in the table, according to an embodiment herein.

FIG. 4 illustrates a table 401 showing implementation of a scan level for performing selected match operations on data contained in the table 401, according to an embodiment herein. The sensitive data discovery engine (SDDE) allows a user to select a scan level for performing the match operations through a graphical user interface (GUI) rendered on a user device. According to an embodiment herein, in enterprise deployment, the SDDE implements different types of scans comprising a full scan of all tables, columns and rows, a sample scan of a number of sample rows in all tables and columns, and an incremental scan of changed or newly added tables and columns. In the full scan, the SDDE executes the selected match operations in the configured scanning pathway for all the tables, columns and rows present in a database. In a sample scan, the number of sample rows, for example, 1000 rows, to be scanned is configurable by an application owner. In the sample scan, the SDDE executes the selected match operations in the configured scanning pathway for all the tables and columns with a sample size of "n" rows, where the parameter "n" is configurable, for example, a value selected from within a range of about 100 to about 1000, and determined by application and data characteristics. In the incremental scan, the SDDE executes the selected match operations in the configured scanning pathway on newly added tables and columns. The SDDE performs the incremental scan when an application is upgraded to a new version.

As illustrated in FIG. 4, the table 401 contains columns named, for example, "Name", "Gender", "Salary", "Address", "Religion", "Date of Birth (DOB)", "Email" and "Age". If a user selects the foil scan as the scan level, the SDDE executes the selected match operations in the configured scanning pathway on all the rows in all the columns of the table 401. If a user selects the sample scan as the scan level and if the application owner configures the sample size as "5" rows, the SDDE executes the selected match operations in the configured scanning pathway on 5 rows in all the columns of the table 401. After an initial scan, if two new columns 402 named, for example, "Country" and "Phone", are added to the table 401 as illustrated in FIG. 4, and if the user selects the incremental scan as the scan level, the SDDE executes the selected match operations in the configured scanning pathway only on the two newly added columns 402. In this case, the user can select a full scan of all the rows of the two newly added columns 402, or a sample scan of a sample size, for example, 5 rows of the two newly added columns 402.

Figure 5:
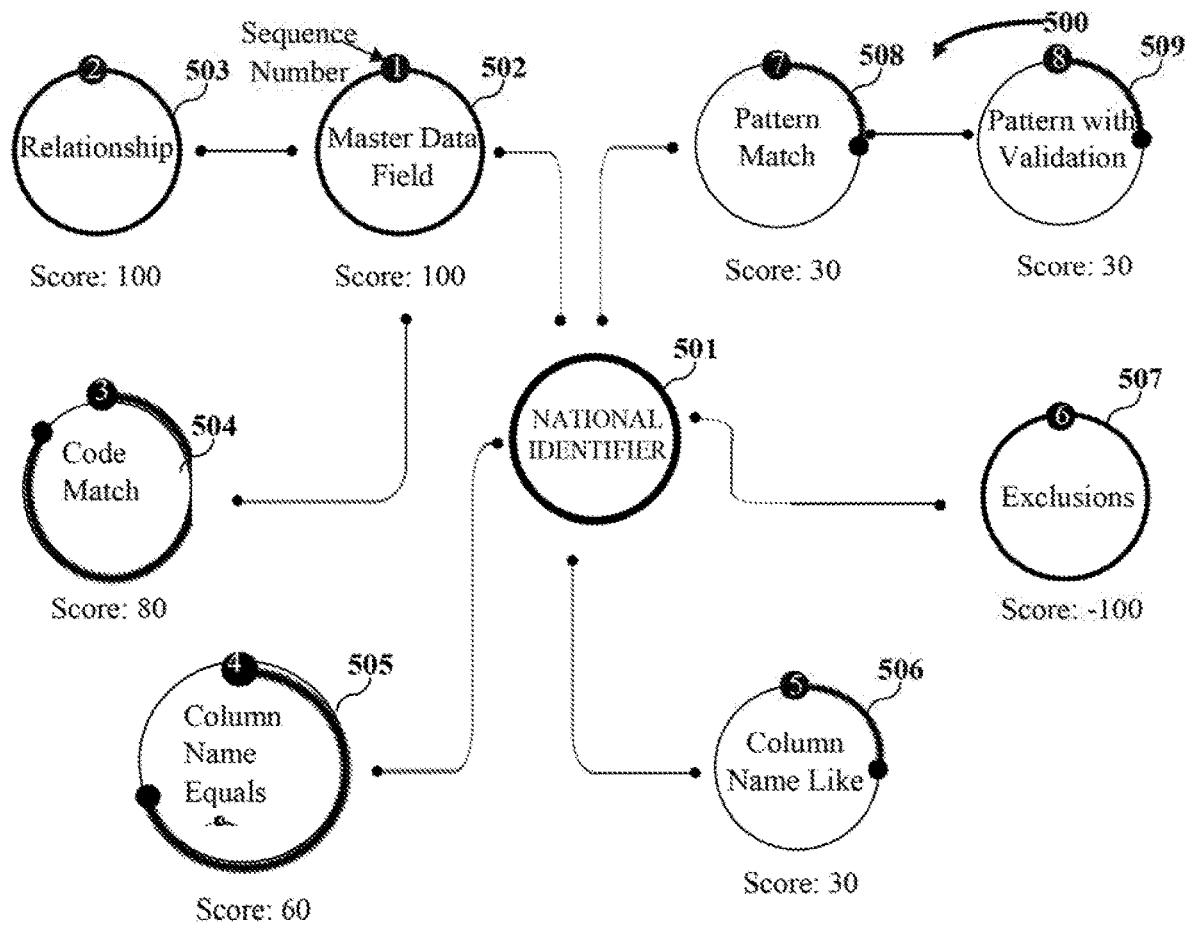
FIG. 5 illustrates a schematic diagram of a scorecard mechanism implemented by the sensitive data discovery engine for scoring data in a table based on a result of each of the selected match operations in the configured scanning pathway, according to an embodiment herein.

FIG. 5 illustrates a schematic diagram of a scorecard mechanism implemented by the sensitive data discovery engine (SDDE) for scoring data in a table based on a result of each of the selected match operations in the configured scanning pathway, according to an embodiment herein. While scanning a column of the table for the presence of sensitive data, as executing a single match operation is not enough to confidently determine the presence of sensitive data, the SDDE configures a scanning pathway that defines a sequence of match operations to be performed on the data in the table for a selected unique data classification. FIG. 5 shows an exemplary sequence in which the match operations are to be executed to determine whether the column contains the unique data classification "National Identifier" 501.

Consider an example where a user selects match operations and the sequence of the selected match operations to be performed on the data in the table for the selected unique data classification, "National Identifier" 501 via the GUI 201 provided by the SDDE exemplarily illustrated in FIG. 2, as follows: (1) "Master Data Field" 502, (2) "Dictionary Match: Relationship" 503, (3) "Code Match" 504, (4) "Dictionary Match: Column Name" or "Column Name Equals" 505, (5) "Dictionary Match: Column Name Expression" or "Column Name Like" 506, (6) "Exclusions" 507, (7) "Pattern Match" 508, and (8) "Pattern Match: Validated with functions" 509. In the match operation, "Exclusions" 507, the SDDE matches table names and column names against preconfigured exclusion patterns. In an embodiment, the SDDE receives the exclusion patterns from the user device via the GUI 201 provided by the SDDE. The SDDE receives the user's selections via the GUI 201 and configures the scanning pathway 500 for scanning the data in the table based on the selected unique data classification, "National Identifier" 501.

The SDDE receives a selection of a scan level, for example, a full scan, a sample scan, or an incremental scan via the GUI and executes the selected match operations in the configured scanning pathway 500 on the data in the table for the selected unique data classification, "National Identifier" 501 based on the received selection of the scan level. The SDDE scores the data based on a result of the match operations in the configured scanning pathway 500. In accordance with the configured scanning pathway 500 exemplarily illustrated in FIG. 5, the match operation, "Master Data Field" 502, is the first match operation to be executed in the sequence. In the match operation, "Master Data Field" 502, the SDDE compares the data or values in a column of the table with values in a master data column. The values in the master data column are known to contain national identifiers. Therefore, if this match operation renders positive results, the SDDE can confidently determine that the column contains a national identifier. The SDDE executes the subsequent match operation, "Dictionary Match: Relationship" 503, in the configured scanning pathway 500 only if the score assigned to the column based on the result of the match operation, "Master Data Field" 502, does not meet the maximum threshold, for example, 100. In this example, since the result of the match operation. "Master Data Field" 502, is positive and the score has reached the maximum threshold of 100, the SDDE terminates execution of the remaining match operations in the configured scanning pathway 500. If the result of the match operation, "Master Data Field" 502, is negative, the SDDE executes the subsequent match operation, "Dictionary Match: Relationship" 503, in the configured scanning pathway 500. As in the previous instance, if the result of the match operation, "Dictionary Match: Relationship" 503, is positive and the score has reached the maximum threshold of 100, the SDDE terminates execution of the remaining match operations in the configured scanning pathway 500. This process continues until the cumulative score of the column has crossed the maximum threshold, or until all the match operations in the configured scanning pathway 500 are completed.

As illustrated in FIG. 5, the assignment of scores during execution of the match operations is as follows: the SDDE assigns a score of 100 to a column of the table based on a positive result of the match operation, "Master Data Field" 502; a score of 100 to the column of the table based on a positive result of the match operation, "Dictionary Match: Relationship" 503; adds a score of 80 to the previous score of the column of the table based on a positive result of the match operation, "Code Match" 504; adds a score of 60 to the previous score of the column of the table based on a positive result of the match operation, "Dictionary Match: Column Name" 505; adds a score of 30 to the previous score of the column of the table based on a positive result of the match operation, "Dictionary Match Column Name Expression" 506; adds a score of −100 to the previous score of the column of the table bused on a positive result of the match operation, "Exclusions" 507; adds a score of 30 to the previous score of the column of the table based on a positive result of the match operation, "Pattern Match" 508; and adds a score of 30 to the previous score of the column of the table based on a positive result of the match operation, "Pattern Match: Validated with functions" 509. The SDDE assigns a score of 0 to a negative result of each of the match operations. The SDDE uses the cumulative score at the end of each match operation to classify the column as sensitive or not sensitive.

Figure 6:
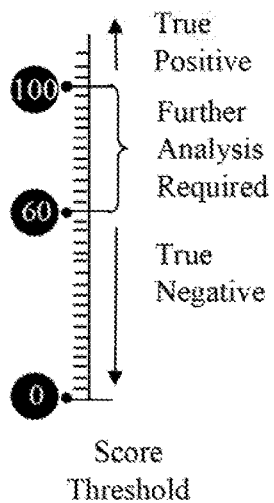
FIG. 6 illustrates a schematic diagram showing validation of scores assigned to the data against threshold criteria, according to an embodiment herein.

FIG. 6 illustrates a schematic diagram showing validation of scores assigned to data against threshold criteria, according to an embodiment herein. As illustrated in FIG. 6, the sensitive data discovery engine (SDDE) configures the threshold criteria comprising a minimum threshold of 0 and a maximum threshold of 100. The minimum threshold of 0 eliminates false positives during the execution of the selected match operations in the configured scanning pathway. The maximum threshold of 100 terminates the execution of the selected match operations in the configured scanning pathway. The SDDE determines sensitive data from the scored data, for example, within 2 or 3 iterations that are required to eliminate false positives. When the cumulative score of a column of a table reaches 100 or above, the SDDE terminates the execution of the selected match operations and the column is classified as sensitive containing the data classification "National Identifier". When the cumulative score is between 60 and 100, the SDDE tags the column as potentially sensitive and requires further analysis and investigation. When the cumulative score is less than 60, the SDDE classifies the column as not sensitive.

Figure 7:
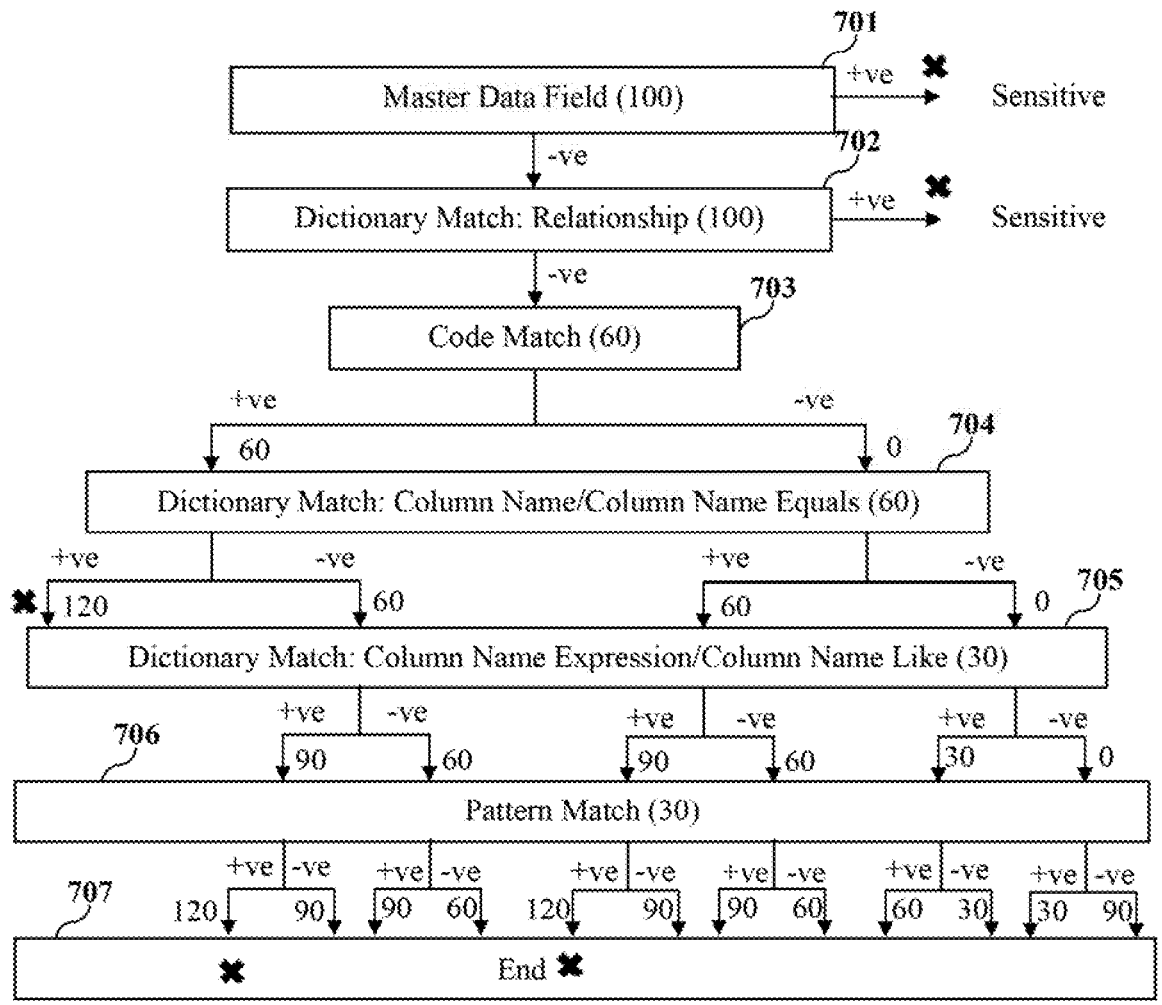
FIG. 7 illustrates a flow diagram for scoring the data based on a result of each of the selected match operations in the configured scanning pathway and determining sensitive data from the scored data, according to an embodiment herein.

FIG. 7 illustrates a flow diagram for scoring data based on a result of each of the selected match operations in the configured scanning pathway and determining sensitive data from the scored data, according to an embodiment herein. Consider an example where the sensitive data discovery engine (SDDE) configures a scanning pathway for scanning a column of a table for a selected unique data classification, for example, "X", where the scanning pathway defines the following sequence of match operations to be performed on data in the column: (1) "Master Data Field" 701; (2) "Dictionary Match: Relationship" 702; (3) "Code Match" 703; (4) "Dictionary Match: Column Name" 704; (5) "Dictionary Match: Column Name Expression" 705; and (6) "Pattern Match" 706. After configuring the scanning pathway and receiving a selection of the scan level via the GUI 201 exemplarily illustrated in FIGS. 2-3, the sensitive data discovery engine (SDDE) proceeds to execute the selected match operations in the configured scanning pathway on the column for the selected unique data classification, "X", based on the received selection of the scan level.

As illustrated in FIG. 7, the SDDE first executes the match operation, "Master Data Field" 701, on the data in the column. If the result of the match operation, "Master Data Field" 701, is positive, the SDDE assigns a score of 100 to the column and validates the score against the set maximum threshold, that is, the SDDE determines whether the score is greater than or equal to the set maximum threshold, for example, 100. Since the score is equal to 100, the SDDE terminates the process and classifies the column as "sensitive". If the result of the match operation, "Master Data Field" 701, is negative, the SDDE executes the subsequent match operation, "Dictionary Match: Relationship" 702, in the configured scanning pathway. If the result of the match operation, "Dictionary Match: Relationship" 702, is positive, the SDDE assigns a score of 100 to the column, and since this score is equal to the set maximum threshold, for example, 100, the SDDE terminates the process and classifies the column as "sensitive". If the result of the match operation, "Dictionary Match Relationship" 702, is negative, the SDDE executes the subsequent match operation, "Code Match" 703, in the configured scanning pathway. If the result of the match operation, "Code Match" 703, is positive, the SDDE assigns a score of 60 to the column and validates the score with the set maximum threshold. Since the score of 60 is less than the maximum threshold, for example, 100, the SDDE proceeds to execute the subsequent match operation, "Dictionary Match: Column Name" 704 in the configured scanning pathway.

If the result of the match operation, "Dictionary Match: Column Name" 704, is positive, the SDDE assigns a score of 60 to the column, and since the cumulative score of the column is 60+60=120, which is greater than the set maximum threshold, for example, 100, the SDDE terminates the process and classifies the column as "sensitive". If the result of the match operation, "Dictionary Match: Column Name" 704, is negative, the SDDE executes the subsequent match operation, "Dictionary Match: Column Name Expression" 705, in the configured scanning pathway. If the result of the match operation, "Dictionary Match Column Name Expression" 705, is positive, the SDDE assigns a score of 30 to the column, and since the cumulative score of the column is 60+30=90, which is less than the set maximum threshold, for example, 100, the SDDE executes the subsequent match operation, "Pattern Match" 706, in the configured scanning pathway. If the result of the match operation, "Pattern Match" 706, is positive, the SDDE assigns a score of 30 to the column, and since the cumulative score of the column is 90+30=120, which is greater than the set maximum threshold, for example, 100, the SDDE terminates the process and classifies the column as "sensitive".

Similarly, if the result of the match operation, "Code Match" 703, is negative, the SDDE executes the subsequent match operation, "Dictionary Match: Column Name" 704, in the configured scanning pathway. If the result of the match operation, "Dictionary Match: Column Name" 704, is positive, the SDDE assigns a score of 60 to the column, and since the cumulative score of the column is 0+60=60, which is less thin the set maximum threshold, for example, 100, the SDDE executes the subsequent match operation, "Dictionary Match: Column Name Expression" 705, in the configured scanning pathway. If the result of the match operation, "Dictionary Match: Column Name Expression" 705, is positive, the SDDE assigns a score of 30 to the column, and since the cumulative score of the column is 60+=90, which is less than the set maximum threshold, for example, 100, the SDDE executes the subsequent match operation, "Pattern Match" 706, in the configured scanning pathway. If the result of the match operation, "Pattern Match" 706, is positive the SDDE assigns a score of 30 to the column, and since the cumulative score of the column is 90+30=120, which is greater than the set maximum threshold, for example, 100, the SDDE terminates the process and classifies the column as "sensitive". The SDDE executes the process in this manner for ail results of the match operations as illustrated in FIG. 7.

Consider an example where the SDDE is implemented in a global staffing agency with the following criteria:
No. of Applications—02
Size of the Applications—1.04 TB and 2 TB respectively
Scan Type—Sample Scan (1000 rows)
Data Classifications in Scope—15 and 13 respectively
On running the SDDE on the applications of the global stalling agency, the SDDE renders the following results:

Count of sensitive tables—1626 and 2779 respectively
Count of sensitive columns—4869 and 12034 respectively
No. of Iterations: 02
Details of Iteration 01: True positives—2682
Investigate—5046
True Negative—3780
Details of Iteration 02: True positives—2142
Investigate—194
True Negative—2523

Consider an example where the SDDE is implemented in a credit rating agency. On running the SDDE on the applications of the global staffing agency, the SDDE renders the following results:
Data Classifications in Scope—19
Count of Sensitive Tables—2118
Count of Sensitive Columns—9360
No. of Iterations: 02
Details of Iteration 01: True positives—12654
Investigate—5009
True Negative—2019
Details of Iteration 02: True positives—10193
Investigate—2714
True Negative—10101

FIG. 8 illustrates a graphical user interface (GUI) 801 provided by the sensitive data discovery engine (SDDE) showing results of a match operation that facilitates configuration of a unique data classification, according to an embodiment herein. As illustrated in FIG. 8, the GUI 801 displays results of a pattern match operation performed on data within source systems spanning across multiple similar and variant data sources and applications, for a unique data classification, "National Identifier". The results list the tables and columns where the data matched with patterns configured for the national identifier. The results also list number of occurrences and the number of rows where the matched data is found. For example, the results list a column named "VALUE" in a table named "FF_ARCHIVE_ITEMS" contains 31 occurrences of a pattern "NNN-NN-NNNN" configured for the national identifier in 535240 rows of the table. In another example, the results list a column named "CONTEXT_LEVEL" in a table named "FF_CONTEXTS" contains 4 occurrences of a pattern "NNNNNNNNN" configured for the national identifier in 32 rows of the table. In another example, the results list a column named "GLOBAL_VALUE" in a table named "FF_GLOBALS_F" contains 6 occurrences of a pattern "NNNNNNNNN" configured for the national identifier in 1788 rows of the table. After executing the pattern match operation, the SDDE classifies the column named "VALUE" as "sensitive". In the computer-implemented method disclosed herein, the presence of patterns matching a pattern configured for the national identifier facilitated the column named "VALUE" to be classified as "sensitive", thereby determining sensitive data in an unvalidated field named "VALUE". Similarly, the SDDE determines sensitive data in another unvalidated field, for example, "DESCRIPTION". The SDDE, therefore, allows discovery of sensitive data in invalidated fields of complex columns.

FIGS. 9A-9B illustrate a table 901 showing details of a scan performed on data in a database, for example, the Oracle® database of Oracle International Corporation. The table 901 shows the database scanned, the scan level such as "sample scan", times of initiation and termination of the scan, the total number of schemas, tables, columns and rows scanned, and indications of the sensitive data schema, tables, columns and rows scanned In an embodiment, the sensitive data discovery engine (SDDE) represents the details shown in the table 901 in a sensitive data discovery map report and renders the sensitive data discovery map report on a GUI displayed on a user device.

FIG. 10 illustrates a table 1001 stowing definitions of unique data classifications and threshold criteria configured for validating scores assigned to data in a database, according to an embodiment herein. The table 1001 shows configurable unique data classifications, for example, "first name" of a private information type, and predefined unique data classifications, for example, "ACN_EXT_NSYN" of a confidential information type. The table 1001 also shows the threshold criteria set, for example, a minimum threshold of 60 and a maximum threshold of 80 used for validating scores assigned to data in the database. In an embodiment, the sensitive data discovery engine (SDDE) represents the definitions and the threshold criteria shown in the table 1001 in a sensitive data discovery map report and renders the sensitive data discovery map report on a GUI displayed on a user device.

FIGS. 11A-11B illustrate a table 1101 showing locations of sensitive data deemed as true positives, determined from a scan performed on data in a database, according to an embodiment herein. In an embodiment, the sensitive data discovery engine (SDDE) represents the locations of the sensitive data in a sensitive data discovery map report and renders the sensitive data discovery map report on a GUI displayed on a user device.

FIGS. 12A-12B illustrate a table 1201 showing columns of tables tagged as potentially sensitive and requiring further analysis and investigation, according to an embodiment herein.

FIGS. 13-14 illustrate tables 1301 and 1401 showing results of identification of sensitive data in complex columns, according to an embodiment herein. In an example, the sensitive data discovery engine (SDDE) runs the following queries to verify the sensitive data discovery map report exemplarily illustrated in FIG. 14.
Query 1: SELECT 'Classification=Complex Column, Schema=HR, Table Name=MENT_TEST_CIF_BKK, Column Name=ACN_EXT_NSYN, Result: '∥ACN_EXT_NSYN as result FROM HR.MENT_TEST_CIF_BKK WHERE ment_dsc_pathways_pkg.ctp (ACN_EXT_NSYN) LIKE '%NNNN-NNNNNNN-NNNNN%';
Query 2: SELECT 'Classification=Complex Column, Schema=HR, Table Name=MENT_TEST_CIF_BK1, Column Name=ACN_EXT_NSYN, Result: 'λACN_EXT_NSYN as result FROM HR.MENT_TEST_CIF_BK1 WHERE ment_dsc_pathways_pkg.ctp (ACN_EXT_NSYN) LIKE '%NNNN-NNNNNNN-NNNNN%';
Query 3: SELECT 'Classification=Complex Column, Schema=HR, Table Name=MENT_TEST_CIF_BK, Column Name=ACN_EXT_NSYN, Result: 'λACN_EXT_NSYN as result FROM HR.MENT_TEST_CIF_BK WHERE ment_dsc_pathways_pkg.ctp (ACN_EXT_NSYN) LIKE '%NNNN-NNNNNNN-NNNNN%';
Query 4: SELECT 'Classification=Complex Column, Schema=HR, Table Name=MENT_TEST_CIF_BAK, Column Name=ACN_EXT_NSYN, Result: '∥ACN_EXT_NSYN as result FROM HR.MENT_ TEST_CIF_BAK WHERE ment_dsc_pathways_pkg.ctp (ACN_EXT_NSYN) LIKE '%NNNN-NNNNNNN-NNNNN%';
Query 5: SELECT 'Classification=Complex Column, Schema=HR, Table Name=MENT_TEST_CIF_NOW, Column Name=ACN_EXT_NSYN, Result: '||ACN_EXT_NSYN as result FROM HR.MENT_TEST_CIF_NOW WHERE ment_dsc_pathways_pkg.ctp(ACN_EXT_NSYN) LIKE '%NNNN-NNNNNNN-NN-NNN%';

Query 6: SELECT 'Classification=Complex Column, Schema=HR, Table Name=MENT_TEST_CIF_BK2, Column Name=ACN_EXT_NSYN, Result: '||ACN_EXT_NSYN as result FROM HR.MENT_TEST_CIF_BK2 WHERE ment_dsc_pathways_pkg.ctp(ACN_EXT_NSYN) LIKE '%NNNN-NNNNNNN-NN-NNN%'.

FIGS. 15A-C illustrate a table 1501 defining a sensitive data discovery map report comprising locations of the sensitive data and the discovery metadata generated by the sensitive data discovery engine (SDDE), according to an embodiment herein.

Figure 16:
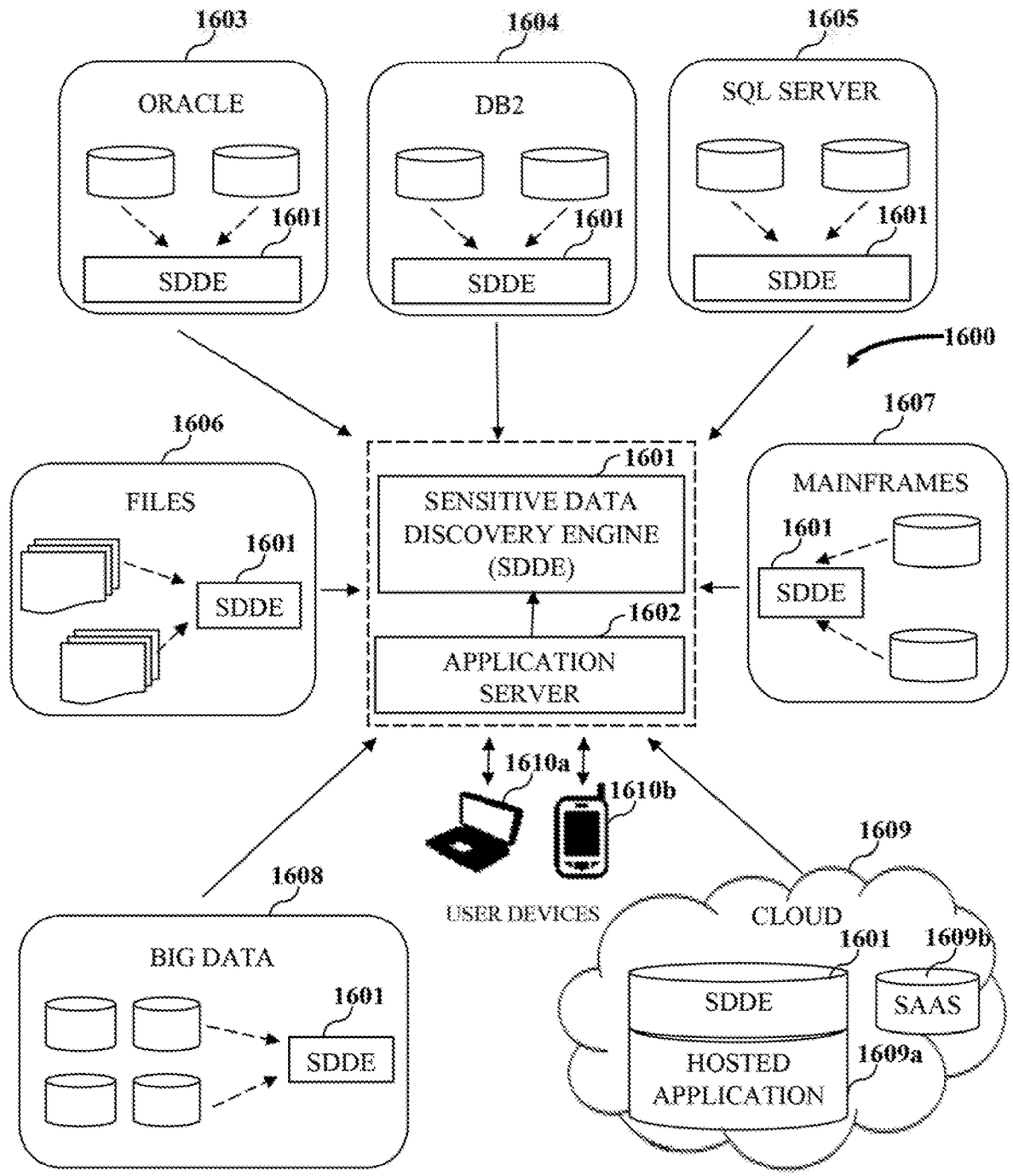
FIG. 16 illustrates a system for discovering substantial sensitive data in source systems spanning across multiple similar and variant data sources and applications, according to an embodiment herein.

FIG. 16 illustrates a system 1600 for discovering substantial sensitive data in source systems spanning across multiple similar and variant data sources and applications, for example, 1603, 1604, 1605, 1606, 1607, 1608, and 1609. The system 1600 disclosed herein comprises the sensitive data discovery engine (SDDE) 1601, a non-transitory computer readable storage medium for storing computer program instructions defined by the SDDE 1601, and at least one processor communicatively coupled to the non-transitory computer readable storage medium for executing the computer program instructions defined by the SDDE 1601 as disclosed in the detailed description of FIG. 17. As used herein, "non-transitory computer-readable storage media" refers to all computer-readable media for example, non-volatile media, volatile media, and transmission media except for a transitory, propagating signal. Non-volatile media comprise, for example, solid state drives, optical discs or magnetic disks, and other persistent memory volatile media including a dynamic random-access memory (DRAM), which typically constitute a main memory. Volatile media comprise for example, a register memory, a processor cache, a random-access memory (RAM), etc. Transmission media comprise, for example, coaxial cables, copper wire, fibre optic cables, modems, etc., including wires that constitute a system bus coupled to a processor.

According to an embodiment herein, the system 1600 disclosed herein is implemented in a cloud computing environment. As used herein, "cloud computing environment" refers to a processing environment comprising configurable computing physical and logical resources, for example, networks, servers, storage media, virtual machines, applications, services, etc., and data distributed over a network. The cloud computing environment provides on-demand network access to a shared pool of the configurable computing physical and logical resources. In another embodiment, the SDDE 1601 is a cloud computing-based platform implemented as a service for discovering substantial sensitive data in source systems spanning across multiple similar and variant data sources and applications. In another embodiment, the SDDE 1601 is implemented is an on-premise software installed and run on computers on the premises of an organization.

According to an embodiment herein as illustrated in FIG. 16, the SDDE 1601 communicates with an application server 1602. In an embodiment, the application server 1602 is configured to support one or more applications. In another embodiment, the application server 1602 comprises the SDDE 1601 configured according to the embodiments disclosed herein. The SDDE 1601 is configured to communicate with the application server 1602 and or with different modules of the application server 1602. In an embodiment, the SDDE 1601 includes or is embodied by a computer system 1701 comprising at least one processor 1702 and at least one memory unit 1703 as exemplarily illustrated in FIG. 17.

According to an embodiment herein, the SDDE 1601 is deployed and implemented as a software agent on each of the similar and variant data sources. For example, the SDDE 1601 is deployed and implemented as an agent on each of the data sources comprising, for example, the Oracle® server 1603 of Oracle International Corporation, the DB2® relational database management system (RDBMS) 1604 of International Business Machines Corporation, a structured query language (SQL) server 1605, file systems 1606, mainframes 1607, big data sources 1608, and cloud data sources 1609 as exemplarily illustrated in FIG. 16. In an embodiment, in the cloud data sources 1669, the SDDE 1601 is implemented, for example, as a software agent on a hosted application 1605a in communication with a software as a system (SaaS) component 1609b. The engine-based scanning and the agent-based scanning performed by the SDDE 1601 provides flexibility to users in discovery of the sensitive data. In an embodiment, the SDDE 1601 performs scanning operations on the data at each of the similar and variant data sources. In another embodiment, the SDDE 1601 retrieves the data from the similar and variant data sources and then performs the scanning operations on the retrieved data.

According to an embodiment herein, the SDDE 1601 is accessible to user devices, for example, 910a and 910b, through a broad spectrum of technologies and devices such as personal computers with access to the internet, internet enabled cellular phones, tablet computing devices, etc. The user devices, for example, 910a and 910b, are electronic devices, for example, one or more of personal computers, tablet computing devices, mobile computers, mobile phones, smart phones, portable computing devices, laptops, personal digital assistants, touch centric devices, workstations, client devices, portable electronic devices, network enabled computing devices, interactive network enabled communication devices, or any other suitable computing equipment and combinations of multiple pieces of computing equipment. Each of the user devices, for example, 910a and 910b, implements applications comprising, for example, web browsing applications, mapping applications, electronic mail (email) applications, etc. In the system 1600 disclosed herein, the SDDE 1601 interfaces with the data sources 1603, 1604, 1605, 1606, 1607, 1608, and 1609 and the user devices, for example, 910a and 910b and therefore more than one specifically programmed computer system is used for discovering substantial sensitive data in source systems spanning across multiple similar and variant data sources and applications.

Figure 17:
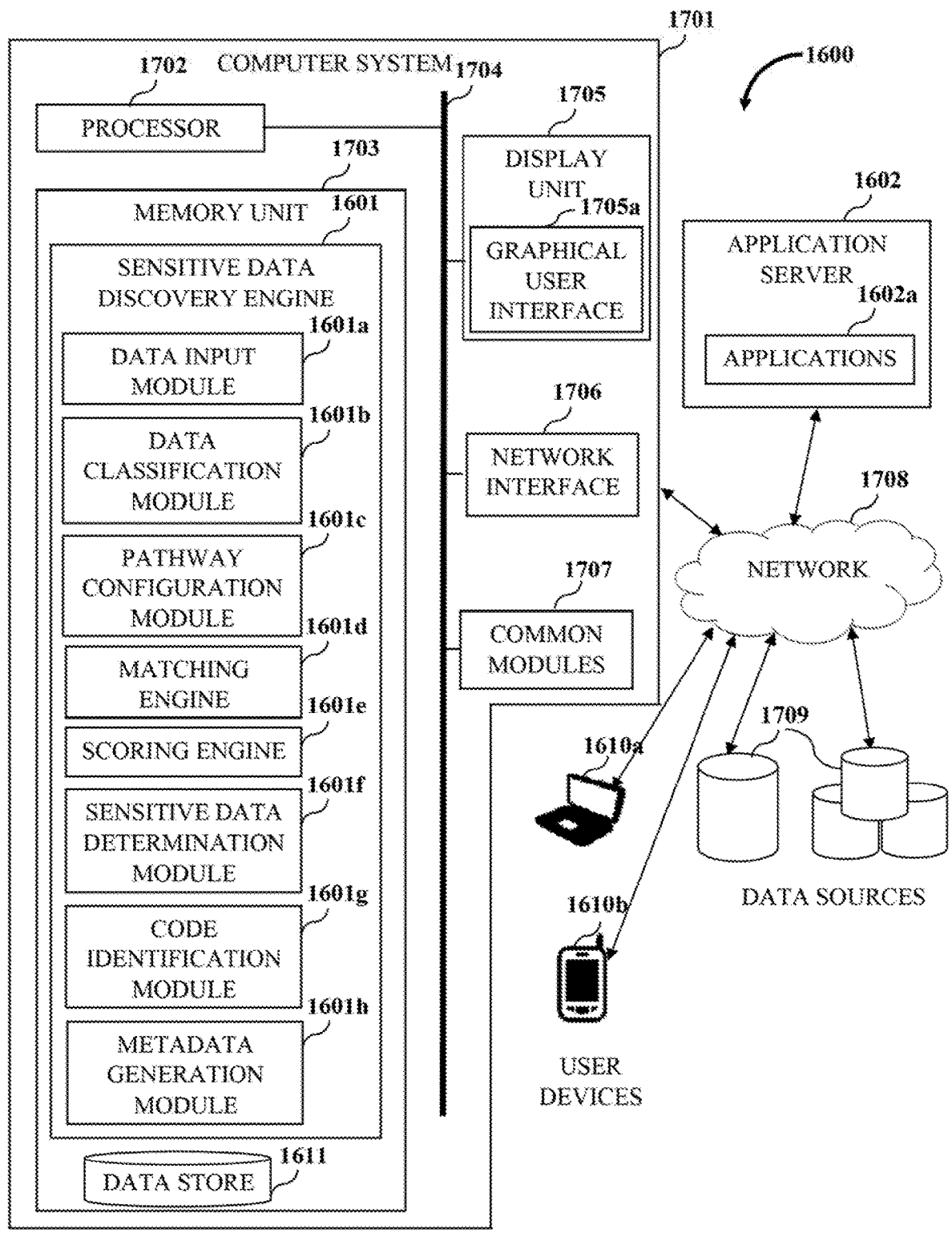
FIG. 17 illustrates an architectural diagram showing an implementation of the sensitive data discovery engine in a computer system for discovering substantial sensitive data in source systems spanning across multiple similar and variant data sources and applications, according to an embodiment herein.

FIG. 17 illustrates an architectural diagram showing an implementation of the sensitive data discovery engine (SDDE) 1601 in a computer system 1701 for discovering substantial sensitive data in source systems spinning across multiple similar and variant data sources 1709 and applications 1602a hosted on an application server 1602. The SDDE 1601 in the computer system 1701 communicates with the application server 1602, the data sources 1709, and the user devices 910a and 910b via a network 1708, for example, a short-range network or a long-range network. The network 1708 is, for example, one of the internet, an intranet, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, etc., a local area network, a wide area network, an internet connection network, an infrared communication network, etc., or a network formed from any combination of these networks.

According to an embodiment herein, the computer system 1701 is programmable using a high-level computer programming language. In an embodiment, the SDDE 1601 is implemented on the computer system 1701 using programmed and purposeful hardware. As illustrated in FIG. 17, the computer system 1701 composes a non-transitory computer-readable storage medium, for example, a memory unit 1703 for storing programs and data, and at least one processor 1702 communicatively coupled to the memory unit 1703. According to an embodiment herein as illustrated in FIG. 17, the memory unit 1703 stores computer program instructions and data associated with the SDDE 1601 on the computer system 1701. According to an embodiment herein, the SDDE 1601 is installed in the memory unit 1703 of the computer system 1701 as exemplarily illustrated in FIG. 17. According to an embodiment herein, the memory unit 1703 comprises a data store 1611 for storing predefined unique data classifications and definitions for unique data classifications received from a user device, for example, 1610a or 1610b, via a graphical user interface (GUI) 1705a. The memory unit 1703 is, for example, a random-access memory (RAM) or another type of dynamic storage device that stores information and instructions for execution by the processor 1702. The memory unit 1703 also stores temporary variables and other intermediate information used during execution of the instructions by the processor 1702. The computer system 1701 further comprises a read-only memory (ROM) or another type of static storage device that stores static information and instructions for the processor 1702.

According to an embodiment herein, the processor 1702 is configured to execute the computer program instructions defined by the SDDE 1601. In another embodiment, the SDDE 1601 is configured as a processor. The SDDE 1601 is implemented by dedicated hardware and/or in an embodiment, comprises software functions executed by the processor 1702. The processor 1702 refers to any one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 1702 is implemented as a processor set comprising, for example, a programmed microprocessor and a math or graphics co-processor. The processor 1702 is selected, for example, from the Intel® processors such at the Itanium® microprocessor, the Pentium® processors, the Intel® Core i5 processor, the Intel® Core i7 processor, etc., Advanced Micro Devices (AMD®) processors such as the Athlon® processor, UltraSPARC® processors, microSPARC® processors, Hp® processors, International Business Machines (IBM®) processors such us the PowerPC® microprocessor, the MIPS® reduced instruction set computer (RISC) processor of MIPS Technologies, Inc., RISC based computer processors of ARM Holdings, Motorola® processors, Qualcomm® processors, etc. The SDDE 1601 disclosed herein is not limited to employing a processor 1702. In an embodiment, the SDDE 1601 employs a controller or a microcontroller. The processor 1702 executes the modules, for example, 1601a, 1601b, 1601c, 1601d, 1601e, 1601f, 1601g, 1601h, etc.

According to an embodiment herein, as illustrated in FIG. 17, the computer system 1701 further comprises a data bus 1704, a display unit 1705, a network interface 1706, and common modules 1707. The data bus 1704 permits communications between the modules, for example, 1702, 1703, 1705, 1706, 1707, etc., of the computer system 1701. The display unit 1705, via graphical user interfaces (GUIs) 1705a, displays information, display interfaces, user interface elements such as checkboxes, input text fields, etc., for example, for allowing users to define unique data classifications, select match operations, and enter sequence numbers for the selected match operations for configuration of a scanning pathway by the SDDE 1601 for scanning data based on metadata and a selected unique data classification. The computer system 1701 renders the GUIs 1705a on the display unit 1705 for receiving user inputs for defining customized, unique data classifications, configuring the scanning pathway, inputs for data matching, patterns, validations, etc. The GUIs 1705a comprise, for example, online web interfaces, web based downloadable application interfaces, mobile based downloadable application interfaces, etc. The display unit 1705 displays the GUIs 1705a comprising the GUIs 201 exemplarily illustrated in FIGS. 2-3 and the GUI 801 exemplarily illustrated in FIG. 8.

According to an embodiment herein, the network interface 1706 enables connection of the computer system 1701 to the network 1708. In an embodiment, the network interface 1706 is provided as an interface card also referred to as a line card. The network interface 1706 is, for example, one or more of an infrared interlace, an interface implementing Wi-Fi® of Wi-Fi Alliance Corporation, a universal serial bus interface, a FireWire® interface of Apple Inc., an Ethernet interface, a frame relay interface, a cable interface, a digital subscriber line interface, a token ring interface, a peripheral controller interconnect interface, a local area network interface, a wide area network interface, interfaces using serial protocols, interfaces using parallel protocols, Ethernet communication interfaces, asynchronous transfer mode interfaces, a high speed serial interface, a fibre distributed data interface, interfaces based on transmission control protocol/internet protocol interfaces based on wireless communications technology such as satellite technology, radio frequency technology, near field communication, etc. The common modules 1707 comprise, for example, input/output (I/O) controllers, input devices, output devices, fixed media drives such as hard drives, removable media drives for receiving removable media, etc. Computer applications and programs are used for operating the SDDE 1601. The programs are loaded onto a fixed media drive and into the memory unit 1703 of the computer system 1701 via the removable media drive. In an embodiment, the computer applications and programs are loaded into the memory unit 1703 directly via the network 1708.

According to on embodiment herein, the SDDE 1601 comprises a data input module 1601a, a data classification module 1601b, a pathway configuration module 1601c, a matching engine 1601d, a scoring engine 1601e, a sensitive data determination module 1601f, a code identification module 1601g, and a metadata generation module 1601h. The data input module 1601a accesses data from multiple similar and variant data sources 1709 and the applications, for example, 1602a. The data sources 1709 comprise, for example, relational databases, hierarchical databases, file systems, text, documents, external files, complex data locations, composite data locations, invalidated fields, binary large objects, character large objects, key value pairs, phantom tables, structured data sources, unstructured data sources, cloud data sources, big data sources, etc. The data classification module 1601b generates configures unique data classifications of the accessed data based on definitions for the unique data classifications received from a user device, for example, 1610a or 1610b, via the GUI 1705a as disclosed in the detailed descriptions of FIG. 1 and FIG. 8. In an embodiment, the data classification module 1601b configures the unique data classifications of the accessed data based on definitions for the unique data classifications retrieved from the data store 1611. The pathway configuration module 1601c configures a scanning pathway for scanning the accessed data based on a selected unique data classification as disclosed in the detailed descriptions of FIGS. 1-3. The scanning pathway defines a sequence of one or more match operations comprising, for example, a master data field match operation, multiple dictionary match operations, a code match operation, multiple pattern match operations, and multiple exact data match operations to be performed on the accessed data for the selected unique data classification. The data input module 1601a receives sequence numbers and selections of the match operations front the user devices 910a and 910b via one or more of the GUIs 1705a tendered on the user devices 910a and 910b as disclosed in the detailed description of FIGS. 2-3. The data input module 1601a receives a selection of a scan level, for example, a full scan, a sample scan, or an incremental scan, for performing the selected match operations through one or more of the GUIs 1705a rendered on the user devices 910a and 910b as disclosed in the detailed description of FIG. 4.

According to an embodiment herein, the matching engine 1601d executes the selected match operations in the configured scanning pathway on the accessed data for the selected unique data classification based on the received selection of the scan level as disclosed in the detailed description of FIG. 1. According to an embodiment herein, the matching engine 1601d validates results of the pattern match operations against master data fields, or master validation functions, or any combination thereof. The scoring engine 1601e scores the accessed data based on a result of each of the executed match operations in the configured scanning pathway as disclosed in the detailed descriptions of FIGS. 5-7. According to an embodiment herein, the scoring engine 1601c validates scores assigned to the accessed data during the scoring of the accessed data against threshold criteria comprising a minimum threshold and a maximum threshold as disclosed in the detailed descriptors of FIGS. 5-7. The sensitive data determination module 1601f determines sensitive data from the scored data. The sensitive data determination module 1601f classifies the accessed data as sensitive data, or potentially sensitive data, or not sensitive data based on the executed match operations in the configured scanning pathway. The code identification module 1601g identifies application codes that operate on the determined sensitive data. The metadata generation module 1601h generates discovery metadata comprising information of users and programs that access the determined sensitive data by inspecting the identified application codes. The sensitive data determination module 1601f generates a sensitive data discovery map report comprising locations of the determined sensitive data and the generated discovery metadata and distributes the generated sensitive data discovery map report for extended use in downstream data protection and governance operations.

According to an embodiment herein, the SDDE 1601 is disclosed above as software implemented on the processor 1702. In an embodiment, the SDDE 1601 is implemented completely in hardware. According to an embodiment herein, the modules, for example, the data input module 1601a, the data classification module 1601b, the pathway configuration module 1601c, the matching engine 1601d, the scoring engine 160e, the sensitive data determination module 1601f, the code identification module 1601g, and the metadata generation module 1601h of the SDDE 1601 are implemented by logic circuits to carry out their respective functions disclosed above. In another embodiment, the SDDE 1601 is also implemented as a combination of hardware and software including multiple processors that are used to implement the modules, for example, 1601a, 1601b, 1601c, 1601d, 1601e, 1601f, 1601g, 1601h, etc., of the SDDE 1601.

According to an embodiment herein, the processor 1702 executes an operating system selected, for example, from the Linux® operating system, the Unix® operating system, any version of the Microsoft® Windows® operating system, the Mac OS of Apple Inc., The IBM® OS/2, VxWorks® of Wind River Systems, Inc., QNX Neutrino® developed by QNX Software Systems Ltd., the Palm OS®, the Solaris operating system developed by Sun Microsystems. Inc., the Android® operating system of Google LLC, the Windows Phone® operating system of Microsoft Corporation, the Black Berry® operating system of BlackBerry Limited, the iOS operating system of Apple Inc., the Symbian™ operating system of Symbian Foundation Limited, etc. The computer system 1701 employs the operating system for performing multiple tasks. The operating system is responsible for management and coordination of activities and sharing of resources of the computer system 1701. The operating system further manages security of the computer system 1701, peripheral devices connected to the computer system 1701, and network connections. The operating system employed on the computer system 1701 recognizes, for example, inputs provided by the user of the computer system 1701 using one of the input devices, the output devices, files, and directories stored locally on the fixed media drive. The operating system on the computer system 1701 executes different programs using the processor 1702. The processor 1702 and the operating system together define a computer platform for which application programs in high level programming languages are written.

According to an embodiment herein, the processor 1702 retrieves instructions defined by the data input module 1601a, the data classification module 1601b, the pathway configuration module 1601c, the matching engine 1601d, the scoring engine 1601e, the sensitive data determination module 1601f, the code identification module 1601g, and the metadata generation module 1601h of the SDDE 1601, for performing respective functions disclosed above. The processor 1702 retrieves instructions for executing the modules, for example, 1601a, 1601b, 1601c, 1601d, 1601e, 1601f, 1601g, 1601h, etc., from the memory unit 1703. A program counter determines the location of the instructions in the memory unit 1703. The program counter stores a number that identifies the current position in the program of each of the modules, for example, 1601a, 1601b, 1601c, 1601d, 1601e, 1601f, 1601g, 1601h, etc. The instructions fetched by the processor 1702 from the memory unit 1703 after being processed are decoded. The instructions are stored in an instruction register in the processor 1702. After processing and decoding, the processor 1702 executes the instructions, thereby performing one or more processes defined by those instructions.

According to an embodiment herein, at the time of execution, the instructions stored in the instruction register are examined to determine the operations to be performed. The processor 1702 then performs the specified operations. The operations comprise arithmetic operations and logic operations. The operating system performs multiple routines for performing a number of tasks required to assign the input devices, the output devices, and the memory unit 1703 for execution of the modules, for example, 1601a, 1601b, 1601c, 1601d, 1601e, 1601f, 1601g, 1601h, etc. The tasks performed by the operating system comprise, for example, assigning memory to the modules, for example, 1601a, 1601b, 1601c, 1601d, 1601e, 1601f, 1601g, 1601h, etc., and to data used by the SDDE 1601, moving data between the memory unit 1703 and disk units, and handling input output operations. The operating system performs the tasks on request by the operations and after performing the tasks, the operating system transfers the execution control buck to the processor 1702. The processor 1702 continues the execution to obtain one or more outputs.

According to an embodiment herein, for purposes of illustration, the detailed description refers to the SDDE 1601 being ran locally as a single computer system 1701; however the scope of the computer-implemented method and the system 1600 disclosed herein is not limited to the SDDE 1601 being run locally on the computer system 1701 via the operating system and the processor 1702, but may be extended to run remotely over the network 1708 by employing a web browser and a remote server, a mobile phone, or other electronic devices. In an embodiment, one or more portions of the SDDE 1601 are distributed across one or mote computer systems (not shown) coupled to the network 1708.

According to an embodiment herein, the non-transitory computer-readable storage medium disclosed herein stores computer program codes comprising instructions executable by at least one processor 1702 for discovering substantial sensitive data in source systems spanning across multiple similar and variant data sources 1709 and applications. The computer program codes implement processes of various embodiments disclosed above and perform additional steps that may be required and contemplated for discovering substantial sensitive data in source systems spanning across multiple similar and variant data sources 1709 and applications. When the computer executable instructions are executed by the processor 1702, the computer executable instructions cause the processor 1702 to perform the steps of the computer-implemented method for discovering substantial sensitive data in source systems spanning across multiple similar and variant data sources 1709 and applications as disclosed in the detailed description of FIG. 1. In an embodiment, a single piece of computer program code comprising computer executable instructions performs one or more steps of the computer-implemented method disclosed in the detailed description of FIG. 1. The processor 1702 of the computer system 1701 retrieves these computer executable instructions and executes them.

According to an embodiment herein, a module or an engine as used herein refers to any combination of hardware, software, and/or firmware. As an example, a module or an engine may include hardware, such as a microcontroller, associated with a non-transitory computer-readable storage medium to store code adapted to be executed by the microcontroller. Therefore, references to a module or an engine, in one embodiment, refers to the hardware, which is specifically configured to recognize and/or execute the code to be held on a non-transitory computer-readable storage medium. Furthermore, in another embodiment, use of a module or an engine refers to the non-transitory computer-readable storage medium including the code, which is specifically adapted to be executed by the microcontroller to perform predetermined operations. In another embodiment, the term "module" or "engine" refers to the combination of the microcontroller and the non-transitory computer-readable storage medium. Often module or engine boundaries that are illustrated as separate commonly vary and potentially overlap. For example, a module or an engine may share hardware, software, firmware, or a combination thereof, while potentially retaining some independent hardware, software, or firmware. In various embodiments, a module or an engine includes any suitable logic.

According to an embodiment herein, the computer-implemented method and the system 1600 comprising the SDDE 1601 are configured for enterprises that are seeking to locate and secure their sensitive data within their source systems that span or scale across multiple data sources 1709 and applications. The SDDE 1601 implements a comprehensive discovery process and facilitates maintenance of compliance with data security regulations that require organizations to secure the sensitive data in their possession. The SDDE 1601 identifies where the sensitive data is located with minimal false positives and which users and what programs access the sensitive data to generate complete discovery metadata for data protection and governance. The generated discovery metadata can be used for protecting the data downstream for masking, encryption, monitoring, mapping, tokenization, retirement, etc., thereby allowing integration for multiple uses. The system 1600 disclosed herein provides an optimal scan architecture for scalability and optimal performance for classifying data as sensitive, potentially sensitive, or not sensitive based on the scorecard mechanism employed. The computer-implemented method and the system 1600 disclosed herein allow role-based access and stakeholder collaborations from application, administration and security and compliance teams. The computer-implemented method and the system 1600 disclosed herein performs comprehensive reporting by generating the sensitive data discovery map report, for example, for compliance requirements and privacy impact assessment that assists organizations in identifying and minimizing privacy risks of new projects or policies. In an embodiment, the SDDE 1601 is implemented in intelligence packs, for example, for Oracle's E-Business Suite and PeopleSoft applications.

According to an embodiment herein, the SDDE 1601 implements a data classification centric approach where each data classification is treated as unique and the sequence of match operations used to discover the sensitive data and in turn the data classification is configured on a case to case basis. The SDDE 1601 is application and data source agnostic and can be scaled across multiple data sources 1709, for example, databases, files, etc. In addition to discovering sensitive data across structured, unstructured, cloud and big data sources, the SDDE 1601 also discovers sensitive data in unvalidated fields of complex columns and in phantom tables where sensitive data is stored for a short time duration for reporting purposes. The match operations used in discovering sensitive data are the same across all data sources 1709, thereby ensuring consistency of the discovery results. For example, the scanning pathway used to identify a national identifier in an SQL database is the same as that used in an Oracle database, thereby ensuring referential integrity when the discovery metadata generated by the SDDE 1601 is used for downstream data protection and governance. The flexibility and ease of configuring the SDDE 1601 as per individual use cases and data classification types allow a comprehensive discovery of the sensitive data.

According to an embodiment herein, the applications of the computer-implemented method and the system 1600 disclosed herein comprise, for example, sensitive data governance, regulatory compliance, and cross-border data security. For example, the SDDE 1601 allows flagging of sensitive data in source systems of an organization and subsequent use of the discovery metadata for data governance initiatives within the organization. Moreover, the SDDE 1601 assists in enforcement of the general data protection regulation (GDPR) in the following articles: For example, in Article 4, the SDDE 1601 assists in discovery of all personal data in a computer system, in Article 35, the SDDE 1601 allows an organization to perform data privacy impact assessment that assesses the impact of processing on personal data using the sensitive data discovery map report; in Article 25, the SDDE 1601 implements a data protection and governance mechanism by design and default using the sensitive data discovery map report; in Articles 33 and 34, the SDDE 1601 identifies sensitive data to facilitate immediate notification of any breach to a supervisory authority and data subject as necessary; and in Article 15 that provides the data subjects the right to access data, the SDDE 1601 identifies and renders the locations of the sensitive data to provide the access. Similarly, the SDDE 1601 assists in enforcing new regulations, for example, the California Consumer Privacy Act, passed after the GDPR.

According to an embodiment herein, for maintaining compliance with regulations using the SDDE 1601, an organization performs an inventory of all data sources in the environment, conducts a high-level assessment of the data sources to identify and prioritize the data sources that could potentially have sensitive data, runs the SDDE 1601 against each data source to systematically locate all sensitive data in the data source, and collects the results and the discovery metadata for use in downstream data protection, governance and compliance reporting. The match operations, the scanning pathways, and the unique data classifications can be configured from within an existing application as per the use case.

According to an embodiment herein, as data residency requirements drive organizations to implement cross-border data security solutions, the SDDE 1601 assists in the comprehensive discovery of sensitive data and the protection and governance of the sensitive data so that sensitive data does not leave the premises of the organizations. The SDDE 1601 is industry agnostic and can be deployed in multiple industries, for example, the financial service industry, the healthcare industry, the retail industry, etc.

It is apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random-access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

According to an embodiment herein, the computer programs that implement the methods and algorithms disclosed herein are stored and transmitted using a variety of media, for example, the computer readable media in various manners. According to an embodiment herein, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages foot can be used comprise C, C++, C#, Java®, JavaScript®, Fortran, Ruby, Perl®, Python®, Visual Basic®, hypertext preprocessor (PHP), Microsoft®.NET, Objective-C®, etc. Other object-oriented, functional, scripting, and/or logical programming languages can also be used. In an embodiment, the computer program codes or software programs are stored on or in one or more mediums as object code. According to an embodiment herein, various aspects of the computer-implemented method and the system 1600 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the computer-implemented method and the system 1600 disclosed herein are implemented as programmed elements, or non-programmed elements, or any suitable combination thereof.

Where databases are described such as the data sources 1709, for example, 1603, 1604, 1605, etc., as illustrated m FIGS. 16-17, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviour of a database can be used to implement various processes such as those disclosed herein In another embodiment, the databases are, in a known manner, stored locally or remotely from a device that accesses data in such a database. In embodiments where there are multiple databases in the system 1600 the databases are integrated to communicate with each other for enabling simultaneous updates of data linked across the databases, when there are any updates to the data in one of the databases.

According to an embodiment herein, the computer-implemented method and the system 1600 disclosed herein can be configured to work in a network environment comprising one or more computers that are in communication with one or more devices via a network 1708. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interlace card, a modem, or other network connection device suitable for connecting to a network 1708. Each of the computers and the devices executes an operating system, examples of which are disclosed above. While the operating system may differ depending on the type of computer, the operating system provides the appropriate communications protocols to establish communication links with the network 1708. Any number and type of machines may be in communication with the computers.

According to an embodiment herein, the computer-implemented method and the system 1600 disclosed herein are not limited to a particular computer system platform, processor, operating system, or network. In an embodiment, one or more aspects of the computer-implemented method and the system 1600 disclosed herein are distributed among one or more computer systems, for example, servers configured to provide one or more services to one or more client computers, or to perform a complete task in a distributed system. For example, one or more aspects of the computer-implemented method and the system 1600 disclosed herein are performed on a client-service system that comprises components distributed among one or more server systems that perform multiple functions according to various embodiments. These components comprise, for example, executable, intermediate, or interpreted code, which communicate over a network 1708 using a communication protocol. The computer-implemented method and the system 1600 disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the computer-implemented method and the system 1600 disclosed herein. While the computer-implemented method and the system 1600 have been described with reference to various embodiments, illustrative implementations, drawings, and techniques, it is understood that the words, which have been used herein, are words of description mid illustration, rather than words of limitation. Furthermore, although the computer-implemented method and the system 1600 have been described herein with reference to particular means, materials, techniques, and embodiments, the computer-implemented method and the system 1600 are not intended to be limited to the particulars disclosed herein, rather, the computer-implemented method and the system 1600 extend to all functionally equivalent structures, methods and uses, such as are within the scope of the appended claims. While multiple embodiments are disclosed, it will be understood by those skilled in the art, having the benefit of the teachings of this specification, that the computer-implemented method and the system 1600 disclosed herein are capable of modifications and oilier embodiments may be effected and changes may be made thereto, without departing from the scope and spirit of the computer-implemented method and the system 1600 disclosed herein.

What is claimed is:

1. A computer-implemented method comprising instructions stored on a non-transitory computer readable storage medium and executed on a hardware processor provided in a computer system for discovering sensitive data in source systems spanning across a plurality of similar and variant data sources and applications, the computer-implemented method comprising the steps of:

accessing data from the plurality of similar and variant data sources and the applications by a sensitive data discovery engine, wherein the plurality of similar and variant data sources comprises relational databases, hierarchical databases, file systems, text, documents, external files, complex data locations, composite data locations, unvalidated fields, binary large objects, character large objects, key value pairs, phantom tables, structured data sources, unstructured data sources, cloud data sources, and big data sources;

configuring, by the sensitive data discovery engine, unique data classifications of the accessed data based on definitions for the unique data classifications received from one of user devices via a graphical user interface provided by the sensitive data discovery engine and a data store;

configuring, by the sensitive data discovery engine, a scanning pathway for scanning the accessed data based on selected unique data classification, wherein the scanning pathway defines a sequence of one or more of match operations to be performed on the accessed data for the selected one of the unique data classifications, and wherein the one or more match operations is selected from a group consisting of a master data field match operation, a plurality of dictionary match operations, a code match operation, a plurality of pattern match operations, and a plurality of exact data match operations;

receiving, by the sensitive data discovery engine, a selection of a scan level for performing the one or more of the match operations through the graphical user interface;

executing, by the sensitive data discovery engine, the one or more of the match operations in the configured scanning pathway on the accessed data for the selected unique data classifications;

scoring, by the sensitive data discovery engine, the accessed data based on a result of each of the executed one or more of the match operations in the configured scanning pathway;

determining, by the sensitive data discovery engine, the sensitive data from the scored data;

identifying, by the sensitive data discovery engine, application codes that operate on the determined sensitive data; and generating, by the sensitive data discovery engine, discovery metadata comprising information of users and programs that access the determined sensitive data by inspecting the identified application codes, and simultaneously generating, by the sensitive data discovery engine, sensitive data discovery map report comprising locations of the determined sensitive data and the generated discovery metadata, wherein the generated sensitive data discovery map report is configured for extended use in downstream data protection and governance operations, and wherein the downstream data protection and governance operations for which the generated sensitive data discovery map report is used comprise data masking, data encryption, data monitoring, data mapping, data tokenization, and data retirement.

2. The method according to claim 1, wherein the scan level comprises a full scan of the entirety of the accessed data, a sample scan of a predefined number of data locations in the plurality of similar and variant data sources and applications, and an incremental scan of newly added data locations.

3. The method according to claim 1, further comprising the step of validating, by the sensitive data discovery engine, scores assigned to the accessed data during the step of scoring the accessed data, against threshold criteria, wherein the threshold criteria comprise a minimum threshold level and a maximum threshold level, and wherein the minimum threshold level is configured to eliminate false positives during the execution of the one or more of match operations in the configured scanning pathway, and wherein the maximum threshold is configured to terminate the execution of the one or more of match operations in the configured scanning pathway.

4. The method according to claim 1, wherein the master data field match operation comprises matching the accessed data against fields and values defined in a master data table.

5. The method according to claim 1, wherein the plurality of dictionary match operations comprises matching the accessed data against primary key and foreign key references, matching the accessed data against exact column names, and matching the accessed data against similar column names.

6. The method according to claim 1, wherein the code match operation comprises matching the accessed data against database objects based on master data fields.

7. The method according to claim 1, wherein the plurality of pattern match operations comprises matching the accessed data against character-based patterns.

8. The method according to claim 1, further comprising the step of validating, by the sensitive data discovery engine, results of the plurality of pattern match operations against one of master data fields, master validation functions, and any combination thereof.

9. The method according to claim 1, wherein the plurality of exact data match operations comprises matching the accessed data against one of column values, master data values defined in master data tables, a preconfigured repository of values, and any combination thereof.

10. The method according to claim 1, wherein the step of determining the sensitive data from the scored data comprises classifying, by the sensitive data discovery engine, the accessed data as one of sensitive data, potentially sensitive data, and not sensitive data based on the executed one or more match operations in the configured scanning pathway.

11. The method according to claim 1, wherein the one or more match operations are selected through the graphical user interface.

12. The method according to claim 1, wherein the generated discovery metadata further comprises historical data related to the determination of the sensitive data and relationships of the users with the sensitive data.

13. A system for discovering sensitive data in source systems spanning across a plurality of similar and variant data sources and applications, the system comprising:

a sensitive data discovery engine;

a non-transitory computer readable storage medium for storing computer program instructions defined by the sensitive data discovery engine; and at least one processor communicatively coupled to the non-transitory computer readable storage medium for executing the computer program instructions defined by the sensitive data discovery engine, the sensitive data discovery engine comprising:

a data input module run on the processor and configured to access data from the plurality of similar and variant data sources and the applications through an algorithm, wherein the plurality of similar and variant data sources comprises relational databases, hierarchical databases, file systems, text, documents, external files, complex data locations, composite data locations, unvalidated fields, binary large objects, character large objects, key value pairs, phantom tables, structured data sources, unstructured data sources, cloud data sources, and big data sources, and wherein the data input module further configured to receive a selection of a scan level for performing the one or more of the plurality of match operations through a graphical user interface;

a data classification module run on the processor and configured to configure unique data classifications of the accessed data through the algorithm based on definitions for the unique data classifications received from a user device via the graphical user interface provided by the sensitive data discovery engine and a data store;

a pathway configuration module run on the processor and configured to configure a scanning pathway for scanning the accessed data through the algorithm based on a selected one of the unique data classifications, wherein the scanning pathway defines a sequence of one or more match operations to be performed on the accessed data for the selected one of the unique data classifications, and wherein the one or more match operations comprises a master data field match operation, a plurality of dictionary match operations, a code match operation, a plurality of pattern match operations, and a plurality of exact data match operations;

a matching engine run on the processor and configured to execute the one or more match operations in the configured scanning pathway on the accessed data for the selected one of the unique data classifications through the algorithm;

a scoring engine run on the processor and configured to score the accessed data based on a result of each of the executed one or more match operations in the configured scanning pathway through the algorithm;

a sensitive data determination module run on the processor and configured to determine sensitive data from the scored data through the algorithm;

a code identification module run on the processor and configured to identify application codes that operate on the determined sensitive data through the algorithm;

a metadata generation module run on the processor and configured to generate discovery metadata comprising information of users and programs that access the determined sensitive data by inspecting the identified application codes through the algorithm; and the sensitive data determination module run on the processor and further configured to generate a sensitive data discovery map report comprising locations of the determined sensitive data and the generated discovery metadata through the algorithm, wherein the generated sensitive data discovery map report is configured for extended use in downstream data protection and governance operations.

14. The system according to claim 13, wherein the data input module is further configured to receive a selection of a scan level for the execution of the one or more match operations, through the graphical user interface, and wherein the scan level comprises a full scan of the entirety of the accessed data, a sample scan of a predefined number of data locations in the plurality of similar and variant data sources and applications, and an incremental scan of newly added data locations.

15. The system according to claim 13, wherein the scoring engine is further configured to validate scores assigned to the accessed data during the scoring of the accessed data against threshold criteria, wherein the threshold criteria comprise a minimum threshold and a maximum threshold, and wherein the minimum threshold is configured to eliminate false positives during the execution of the one or more match operations in the configured scanning pathway, and wherein the maximum threshold is configured to terminate the execution of the one or more match operations in the configured scanning pathway.

16. The system according to claim 13, wherein the master data field match operation comprises matching the accessed data against fields and values defined in a master data table, and wherein the plurality of dictionary match operations comprises matching the accessed data against primary key and foreign key references, matching the accessed data against exact column names, and matching the accessed data against similar column names, and wherein the code match operation comprises matching the accessed data against database objects based on master data fields, and wherein the plurality of pattern match operations comprises matching the accessed data against character-based patterns, and wherein the plurality of exact data match operations comprises matching the accessed data against one of column values, master data values defined in master data tables, a preconfigured repository of values, and any combination thereof.

17. The system according to claim 13, wherein the matching engine is further configured to validate results of the plurality of pattern match operations against one of master data fields, master validation functions, and any combination thereof.

18. The system according to claim 13, wherein the sensitive data determination module is further configured to classify the accessed data as one of sensitive data, potentially sensitive data, and not sensitive data based on the executed one or more match operations in the configured scanning pathway.

19. The system according to claim 13, wherein the downstream data protection and governance operations for which the generated sensitive data discovery map report is used comprise data masking, data encryption, data monitoring, data mapping, data tokenization, and data retirement.

* * * * *